(12) United States Patent
Secomb

(10) Patent No.: US 12,082,755 B2
(45) Date of Patent: Sep. 10, 2024

(54) FOLDING SHOWER STALLS

(71) Applicant: Tetravan LLC, Salt Lake City, UT (US)

(72) Inventor: Julian Secomb, Salt Lake City, UT (US)

( * ) Notice: Subject to any disclaimer, the term of this patent is extended or adjusted under 35 U.S.C. 154(b) by 109 days.

(21) Appl. No.: 18/149,948

(22) Filed: Jan. 4, 2023

(65) Prior Publication Data

US 2023/0146252 A1 May 11, 2023

(51) Int. Cl.
*A47K 3/32* (2006.01)
*B60R 15/02* (2006.01)
*A47K 3/36* (2006.01)

(52) U.S. Cl.
CPC .............. *A47K 3/32* (2013.01); *B60R 15/02* (2013.01); *A47K 2003/365* (2013.01)

(58) Field of Classification Search
CPC ..... A47K 3/32; A47K 3/325; A47K 2003/365
USPC ........................................................... 4/599
See application file for complete search history.

(56) References Cited

U.S. PATENT DOCUMENTS

| | | | | |
|---|---|---|---|---|
| 1,145,568 A | * | 7/1915 | Dardano | A47K 3/325 49/71 |
| 3,646,590 A | * | 2/1972 | Bolt | A47K 3/32 4/600 |
| 3,869,734 A | * | 3/1975 | Bolt | A47K 3/32 4/600 |

* cited by examiner

*Primary Examiner* — Huyen D Le
(74) *Attorney, Agent, or Firm* — Miller IP Law; Devin Miller

(57) ABSTRACT

Described herein are examples of devices which include a folding shower stall including a shower pan, a shower wall and optionally a shower curtain enclosure. The shower pan includes a drain wall and drain slots configured to drain wastewater from the folding shower stall. A shower pan support disposed on a shower pan outer surface and configured to angle the shower pan directing wastewater backwards towards the drain. The shower wall including apertures configured to receive plumbing infrastructure to receive shower components including a shower head a mixer. The shower pan and the shower wall are pivotally connected via a hinge configured to allow the shower pan to rotate upward toward the shower wall to close and downward to be in an open position.

20 Claims, 16 Drawing Sheets

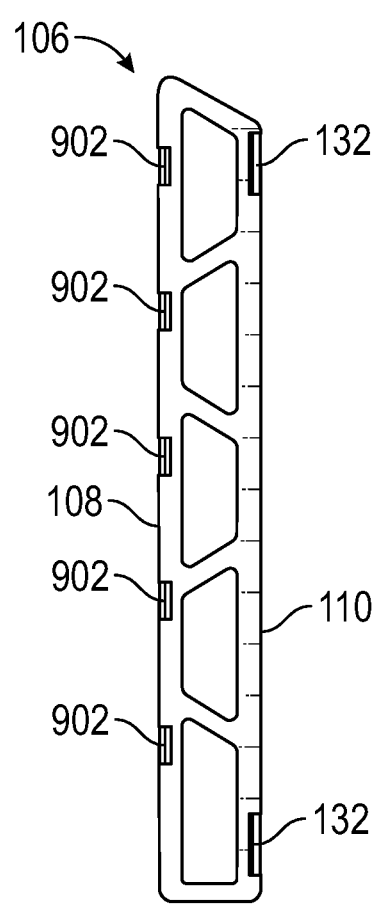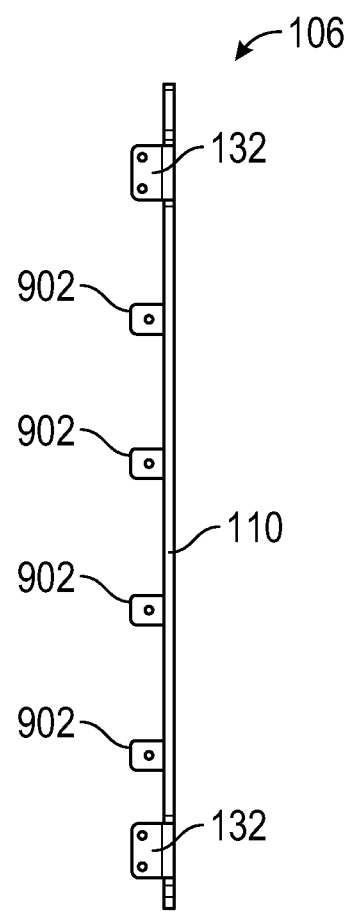
FIG. 8
FIG. 9

FOLDING SHOWER STALLS

CROSS-REFERENCE TO RELATED APPLICATIONS

The present application claims the benefit of U.S. Provisional Patent Application No. 63/296,233 entitled "APPARATUS AND METHOD FOR FOLDING SHOWER STALL", filed on Jan. 4, 2022. The entire contents of the above-listed application are hereby incorporated by reference for all purposes.

BACKGROUND

Recreational vehicles, mobile homes and other types of vehicles have limited space available for the numerous appliances, storage space, and modern conveniences often found in permanent residences. One area of particular interest for vehicles is the ability to replicate modern bathrooms, and more particularly, shower stalls. The necessary space, plumbing infrastructure, and water friendly designs can lead to space and cost issues that often result in the elimination of showers or shower like structures from vehicles.

BRIEF DESCRIPTION OF THE DRAWINGS

The present description will be understood more fully when viewed in conjunction with the accompanying drawings of various examples of folding shower stalls. The description is not meant to limit the folding shower stalls to the specific examples. Rather, the specific examples depicted and described are provided for explanation and understanding of folding shower stalls. Throughout the description the drawings may be referred to as drawings, figures, and/or FIGS.

FIG. 8 illustrates a bracket of a folding shower stall, according to an embodiment.

FIG. 9 illustrates a bracket of a folding shower stall, according to an embodiment.

DETAILED DESCRIPTION

A folding shower stall as disclosed herein will become better understood through a review of the following detailed description in conjunction with the figures. The detailed description and figures provide merely examples of the various embodiments of folding shower stalls. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional shower facilities in a vehicle are often non-existent or reserved for high-end recreational vehicles with hundreds of usable square feet. While most mobile homes with a have limited plumbing infrastructure, and minimal space for bathing, be it a small tub and/or upright shower, most vehicles are completely lacking in bathing facilities. Two of the biggest obstacles are cost and available space. Most vehicles, such as trucks, vans, trailers, campers, boats, planes, and other suitable vehicles, are designed to have limited weight and limited space to reduce both construction costs and fuel costs. Additionally, except for mobile homes, camper vans, recreational vehicles and other specially designed vehicles, most vehicles are lacking in plumbing infrastructure necessary for bathing. Space is limited in vehicles and a permanent shower facility takes up significant square and cubic footage. Additionally, a permanent shower facility is often only used for 15-30 minutes a day. The remainder of the day the permanent shower facility is taking up valuable space that could be put to better use.

One conventional solution has been to use a drain in the floor of vehicles, such as campervans. However, without a solid enclosure and proper water proofing, this option can lead to water damage issues from water spilling over the floor of the vehicles. The damage can include potentially disrupting and/or damaging electrical devices or components of the vehicle, as well as causing regular water damage to other structures.

The cost and space issues have often resulted in the consumer forgoing the much-desired ability to have bathing, and more particularly, showering capability in their vehicles.

Implementation of the folding shower stalls may address some or all of the problems described above. Folding shower stalls can be prepared to occupy minimal space, readily incorporate existing plumbing infrastructure, and/or can be installed with plumbing infrastructure configured and/or prefabricated to work with vehicles.

Figure 1:
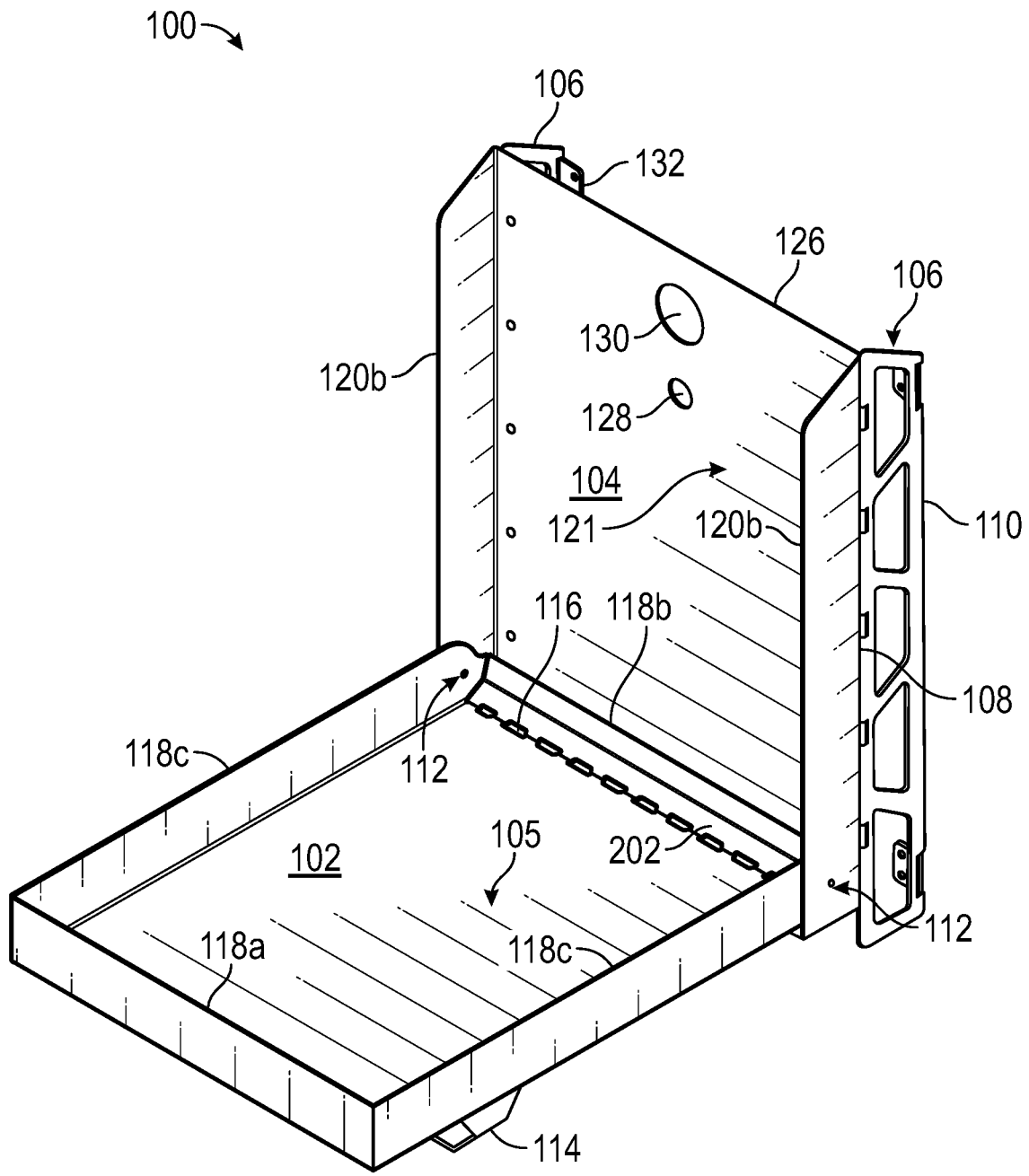
FIG. 1 illustrates a folding shower stall in an open position, according to an embodiment.

FIG. 1 illustrates a folding shower stall 100 in an open position, according to an embodiment. As illustrated in FIG. 1, the folding shower stall 100, includes a shower pan 102, a vertically oriented shower wall 104, and first and second attachment brackets 106a, 106b that are configured to secure the shower wall 104 to a vertical, or substantially vertical structure, such as a vertical side wall of a vehicle, including, but not limited to a van, a truck, a recreational vehicle, a camper, a campervan, a mobile home, a boat, an airplane, or other vehicle. Embodiments of the folding shower stall 100 can be secured directly to or into the vertical structure without the use of the first and second attachment brackets 106a, 106b. Alternatively, the folding shower stall 100 can be secured to other structures, such as, but not limited to, a fence, a building, an interior wall of a house or apartment, posts, or other structures. When the term structure is used herein, it can mean a vehicle, a vertical wall of a vehicle, or a free-standing structure, such as a house, building or other construction.

As illustrated in FIG. 1, the shower pan 102 and the shower wall 104 are rotatably secured together at hinge 112 (or pivot point). Any suitable rotatable attachment fastener may be used, including, but not limited to a bolt and nut, screw, rivet, brads or other attachment fasteners. When the folding shower stall 100 is in a closed position, the shower pan 102 can be configured to fit within the shower wall 104. Alternatively, the shower pan 102 can fit outside of the shower wall 104, or the aligned edges of the shower pan 102 and shower wall 104 may be adjacent to each other.

The shower pan 102 comprises a shower pan front side wall 118a, a shower pan back side wall 118b, and opposing shower pan left and shower pan right side walls 118c extending outwardly from the shower pan upper surface 105. The shower pan 102 can be square, rectangular, oval, circular, or any shape suitable for use as a folding shower stall 100.

Embodiments of the shower pan front side wall 118a, can be between 18 inches and 36 inches in length, and between 2 inches and 4 inches in height. A most preferred embodiment of the shower pan front side wall 118a can be 21.5 inches in length, and 3.5 inches in height. The shower pan front side wall 118a can be varied in accordance with the size and scale of the other features of the folding shower stall 100.

The shower pan back side wall 118b, can be between 18 inches and 36 inches in length, and between 2 inches and 4 inches in height. A most preferred embodiment of the back side wall 118b can be 21.5 inches in length, and 3.5 inches in height. In a rectangular or square configuration, the length of the shower pan back side wall 118b and the shower pan front side wall 118a will be equal or approximately equal. The height of the shower pan front side wall 118a and shower pan back side wall 118b will differ due to the inclusion of the drain wall 202. The drain wall 202 extends downward from the shower wall upper surface 105 and outwardly from the shower pan upper surface 105. The shower pan back side wall 118b can be varied in accordance with the size and scale of the other features of the folding shower stall 100.

The shower pan left and right side wall 118c, can be between 18 and 36 inches in length, and 2 and 5 in height. A most preferred embodiment of the shower pan left and right side walls 118c can be 28 inches in length, and 3.5 inches in height. The shower pan left and right side wall 118c can be varied in accordance with the size and scale of the other features of the folding shower stall 100.

The width of the shower pan side walls 118 can be between 0.02 inches and 1 inch. A most preferred width is 0.08 inches.

The shower pan side walls 118 are configured to retain the lower edges of a shower curtain or shower curtain enclosure within the shower pan 102 and direct the flow of wastewater into the bottom of the shower pan 102. The shower pan 102 is configured to have a downward angle directed towards a drain wall 202 (or small portion) of the shower pan 102. The angle of the shower pan is determined by the maximum rotation of the hinge 112 (or pivot) and/or by structures supporting the shower pan 102 on the horizontal surface upon which the shower pan 102 rests in the open position. The angle of the shower pan 102 in the open position is between 0 degrees and 5 degrees, preferably between 0.5 degrees and 3 degrees, and most preferably between 1.0 degrees and 2 degrees. Embodiments include a most preferred angle of 1.5 degrees.

The drain wall 202 of the shower pan 102 is adjacent and contiguous with the shower pan back side wall 118b. The drain wall 202 and the shower pan back side wall 118b are in proximity to the shower wall 104 in the open position. In an embodiment, there is space between the shower pan back side wall 118b and the shower wall 104 that allows water not retained in the shower pan 102 to empty into the shower wall bottom side wall 120a. The downward angle of the shower pan 102 is configured to direct the flow of used shower water towards the drain wall 202 and drain slots 116 that are located in the shower pan upper surface 105 proximate to the drain wall 202. The drain wall 202 is also angled to direct wastewater into the drain slots 116. The angle of the drain wall 202 is between 10 degrees and 90 degrees, preferably between 15 degrees and 60 degrees, and most preferably between 20 degrees and 40 degrees. A most preferred angle is 30 degrees. The drain wall 202 is angled to allow the shower pan 102 to rotate freely into the shower wall 104.

In an embodiment, the drain wall 202 and the shower pan back side wall 118b form a contiguous wall wherein the drain wall 202 extends downward from the back side wall 118b at an angle towards the shower pan front side wall 118a. Additionally, the drain slots 116 disposed in the shower pan upper surface 105 is generally proximate to the drain wall 202 and run the width of the shower pan upper surface 105.

The length of the drain wall 202 (in a rectangular or square configuration) is equal to the length of the shower pan front and back side wall 118a, 118b. The height of the drain wall (herein defined as the distance from the drain slots 116 to the bottom edge of the shower pan back side wall 118b) can be between 0.1 inches and 4 inches. A most preferred height of the drain wall 202 is 2 inches.

The drain slots 116 can run the entire width of the shower pan 102 or they can be spaced at intervals. The length and width of the drain slots 116 can be varied to provide greater or lesser drainage from the shower pan 102. The drain slots 116 are configured to allow the collected wastewater to be drained out of the shower pan 102. Wastewater will drain from the shower pan 102 through the drain slots 116. The walls of the shower pan 102 allow wastewater to drain in situations where the horizontal orientation of the vehicle is not centered. For example, in the situation where the vehicle is parked at an incline along the vehicle's pitch axis, the configuration of the shower pan side walls 118, and the angle of the shower pan 102 forces the wastewater towards the drain slots 116. For example, if the wastewater collects to one side of the shower pan 102, because of the incline, the wastewater will still drain from the shower pan 102. Similarly, the downward slope of the shower pan 102 (and/or the slope of the drain wall 202) can direct water to the drain slots 116 even if the vehicle is parked at an angle with respect to its roll axis.

As further illustrated in FIG. 1, the shower wall 104 includes a shower wall bottom side wall 120a and shower wall right and left side walls 120b extending outwardly from the shower wall front surface 121. Disposed in the shower wall bottom side wall 120a of the shower wall 104 is drain aperture 122. The dimensions of the drain aperture 122 are sized and/or configured to be able to receive and retain any suitable selected drain hole attachment that can be coupled to a drain hose. The drain aperture 122 can have a diameter be between 0.75 inches and 4 inches, preferably between 1 inch and 3 inches, and most preferably between 1.5 inches and 2.5 inches. A most preferred diameter of the drain aperture 122 is 2 inches. Variations on the size of the drain aperture 122 can be adjusted in view of the size and scale of the folding shower stall 100.

Disposed in a shower wall front surface 121 towards the shower wall upper edge 126 of the shower wall 104 (distal from the bottom side wall 120a) can be a first aperture 128 and a second aperture 130. The first and second front surface apertures 128, 130 can be configured to receive and secure components of a water delivery system or plumbing infrastructure that can provides hot and/or cold water to the folding shower stall 100. For example, the first aperture 128 can be configured to receive and secure a faucet that controls water temperature and/or the amount of water flow. Additional apertures may be provided depending upon the type of faucet.

The attachment brackets 106a, 106b can be configured to secure the shower wall 104 to a vertical, or substantially vertical, structure (not shown). The attachment brackets include a attachment bracket first edge 108 that can be secured to the back side of the shower wall 104 proximate to the edges (sides) of the shower wall 104. The attachment brackets 106a, 106b further include a second edge 110 opposite the first edge 108. The attachment bracket second edge 110 can be secured to the vertical, or substantially vertical, structure. The attachment brackets 106a, 106b provide a rigid and durable structure that is used to secure the folding shower stall 100 to the structure. The attachment brackets 106a, 106b can be configured to be equal in height to the shower wall 104, shorter in height than the shower wall 104, or greater in height than the shower wall 104, depending on the weight of the folding shower stall 100 and/or other requirements associated with securing the folding shower stall 100 to the structure.

Figure 2:
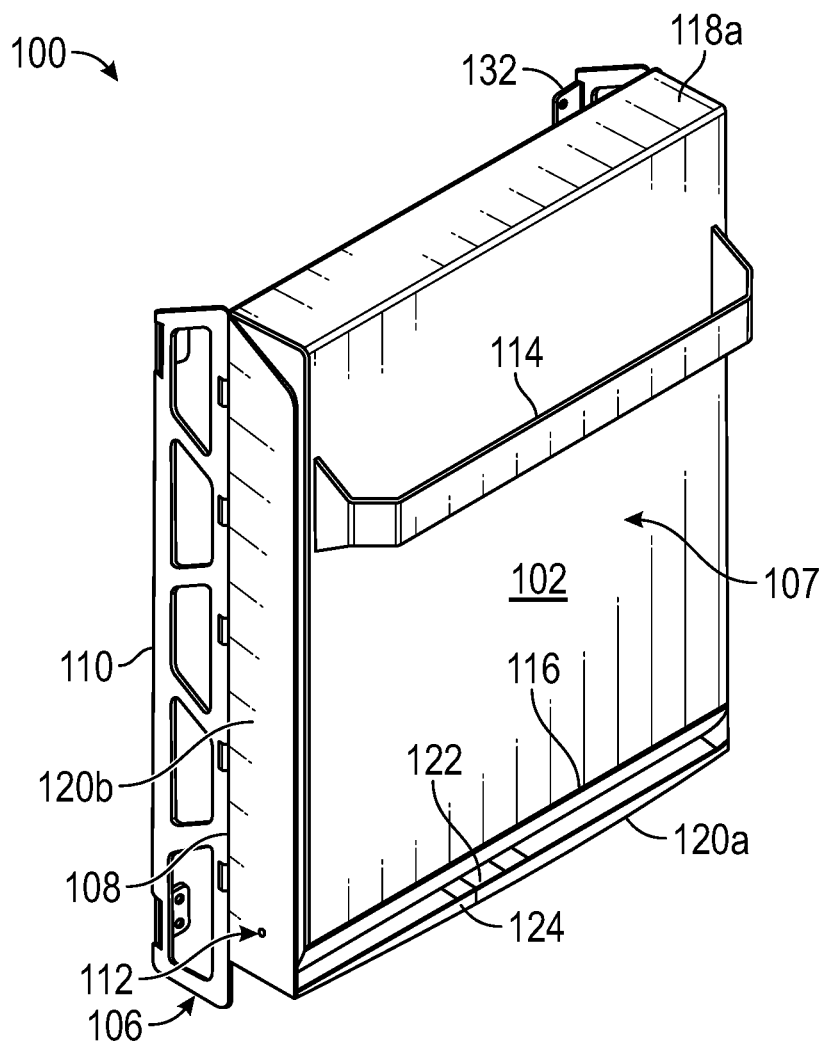
FIG. 2 illustrates a folding shower stall in a closed position, according to an embodiment.

Additionally, the attachment brackets 106a, 106b extend the shower wall 104 outwardly from the structure to accommodate plumbing infrastructure, such as hoses, pipes, drains, and/or similar equipment that can provide clean hot and/or cold water for showering and that remove wastewater. The shape and dimensions of the attachment brackets 106a, 106b, including, but not limited to the second edge 110, can be configured based on the shape, material, size, space or other features of the structure upon which the folding shower stall 100 is attached. In embodiments, in which the attachment brackets 106a, 106b are omitted, the folding shower stall 100 may be installed directly onto or into a cabinet, wall, or other structure. The attachment brackets 106 can be solid or latticed as shown in FIG. 2. The lattice structure can provide the necessary support with reduced weight.

In an embodiment, the second aperture 130 can be sized to permit passage of a shower hose and shower head that the user can pull out to a predefined length allowing the user to shower while standing on the shower pan 102. In embodiments, a shower sprayer holder (not shown) can be secured to the shower wall 104 to allow the user to secure the shower head during a shower and/or when the folding shower stall 100 is not in use.

The attachment brackets 106 can secure the shower wall 104 at a predefined distance out and away from the side of the structure upon which the folding shower stall 100 is mounted. This allows for sufficient room to receive a shower hose when the folding shower stall 100 is not in use. mounting tabs 132 can be disposed along the second edge 110 of the attachment brackets 106 to facilitate attachment of the attachment brackets 106 to the structure. Any suitable attachment means, such as bolts, screws, wires, adhesive, and/or welding may be used in the various embodiments to secure the attachment bracket 106 to the structure upon which the folding shower stall 100 is secured.

FIG. 2 illustrates a folding shower stall 100 in a closed position, according to an embodiment. As illustrated in FIG. 2, the folding shower stall 100 further includes a shower pan support 114, a shower wall retaining wall 124 and a shower pan outer surface 107.

The shower wall bottom side wall 120a of the shower wall 104 can have a shower wall retaining wall 124 that extends perpendicularly from the shower wall bottom side wall 120a. The lower surface of the shower wall 104, the shower wall right and left side walls 120b, and the shower wall retaining wall 124 cooperatively retain wastewater within the lower part of the shower wall 104, thereby forming a wastewater retainment structure. Embodiments of the shower wall bottom side wall 120a have a downwards angle towards the drain aperture 122 to direct accumulated wastewater towards the drain aperture 122 regardless of the pitch and/or roll axis of the structure that the folding shower stall 100 is secured to. Embodiments of the shower wall retaining wall 124 extend from the shower wall right side wall 120b to the shower wall left side wall 120b. Embodiments of the shower wall retaining wall 124 can be between 0.5 inches and 6 inches in height, preferably between 1 inch and 4 inches in height, and most preferably between 1.5 inches and 3 inches in height. Alternative embodiments of the shower wall retaining wall 124 can also include a drip edge 127 that extends outward and generally perpendicular from the shower wall retaining wall 124 and at an angle downwards back into the wastewater retainment structure. The angle of the drip edge 127 can be between 1 and 30 degrees, preferably between 2 and 20 degrees, and most preferably approximately 15 degrees. The shower wall retaining wall 124 extends outwardly from the shower wall bottom side wall 120c and a drip edge 127 extends outwardly from the shower wall retaining wall 124.

Embodiments of the shower wall bottom side wall 120a, can be between 10 and 30 inches in length, and 1 and 6 inches in height, preferably between 18 inches and 24 inches in length, and 2 inches and 5 inches in height, A most preferred length and height are 21.75 inches and 3.5 inches. The shower wall bottom side wall 120a is larger than the shower pan back side wall 118 b allowing the shower pan back side wall 118b to fit inside the shower wall bottom side wall 120a. Variations on the size of the shower wall bottom side wall 120a can be adjusted in view of the size and scale of the folding shower stall 100.

The shower wall right side wall 120b and shower wall left side wall 120b can be between 20 inches and 40 inches in length, and 3 inches and 4 inches in height, preferably between 25 inches and 35 inches in length, and 2 inches and 5 inches in height. A most preferred length and height are 28 inches and 3.5 inches. Variations on the size of the shower wall right side wall 120b and shower wall left side wall 120b can be adjusted in view of the size and scale of the folding shower stall 100.

The ends of the shower wall right and left side walls 120b distal to the bottom side wall 120a can be tapered to assist with closing of the folding shower stall 100. Alternate embodiments can be squared with a top side wall completing the enclosure of the shower wall front surface 121.

As illustrated in FIG. 2, the folding shower stall 100 in the closed positions projects outwardly from the structure or vehicle side wall upon which it is mounted, such as the interior of a vehicle, between 1 and 10 inches, preferably between 2 and 8 inches, and most preferably between 3 and 7 inches. One embodiment projects out from the structure approximately 6 to 7 inches, not including the attachment brackets 106a, 106b. In an embodiment, in the open position the folding shower stall 100 can occupy approximately four square feet of surface area. Embodiments can occupy between 1 and 10 square feet, preferably between 2 and 8 square feet, and most preferably between 3 and 5 square feet. Depending upon the embodiment, a shower curtain enclosure can extend the folding shower stall 100 to be equivalent to a full height shower stall.

To operate the folding shower stall 100 a user grasps the shower pan support 114 and rotates the shower pan 102 in a downward direction about the hinge 112 (or pivot). In embodiments the shower pan support 114 is disposed on a shower pan outer surface 107. The shower pan outer surface 107 is opposite the shower pan upper surface 105. The shower pan support 114 provides a convenient handle for the user to grasp when opening and closing the folding shower stall 100. The shower pan 102 and the shower wall 104 are pivotally connected via the hinge 112 which is configured to allow the shower pan 102 to rotate upward toward the shower wall 104 (closed position), and downwards away from the shower wall 104 (open position). To place the folding shower stall 100 in the open position, the user moves the shower pan 102 downwards until the shower pan support 114 engages the floor of the structure. For example, if the shower wall 104 is secured to a side of a vehicle (via the attachment brackets 106), the shower pan 102 is rotated downwardly until the shower pan support 114 engages the vehicle floor. In an embodiment the shower pan support 114 extends outwardly from the shower pan outer surface 107 and laterally across the shower pan outer surface 107 and is configured to engage a horizontal surface of the vehicle or structure when the shower pan 102 is rotated downward from the shower wall 104. Any suitable shower pan support 114 may be used in the various embodiments. In embodiments in which the attachment brackets 106 are omitted, the folding shower stall 100 can be installed in a cabinet or other structure.

The shower pan support 114 extends outwardly from the shower pan outer surface 107 by a predefined distance. The predefined distance of the protrusion of the shower pan support 114 is such that the outer surface 107 (and upper surface 105) of the shower pan 102 is oriented at a downward angle towards the rear of the shower pan 102 (proximate to the shower wall 104). This downward angle directs wastewater towards the drain slots 116. The shower pan support 114 is configured to rest on a horizontal surface of a structure when the shower pan 102 is rotated downward from the shower wall 104 into an open position. The shower pan support further includes scratch resistant components 115 configured to contact the horizontal surface of the structure. The shower pan support 114 is configured to position the shower pan 102 in the open position at an angle that directs wastewater backwards towards the shower pan back side wall 118a, drain wall 202 and drain slots 116.

In an embodiment the shower pan support 114 can be between 1 inches and 9 inches in height (measured from the shower pan outer surface 107 to a central axis of the shower pan support 114), preferably between 2 inches and 6 inches, most preferably between 2.5 inches and 3.5 inches. A most preferred embodiment of the shower pan support 114 can have a height of 3 inches. The shower pan support 114 can run the width of the shower pan 102 or occupy less than the total width of the shower pan 102. Alternatively, the shower pan support 114 can be split into multiple segments along the shower pan outer surface 107 to provide support to the folding shower stall 100. The downward angle of the shower pan 102 is discussed above.

Figure 3:
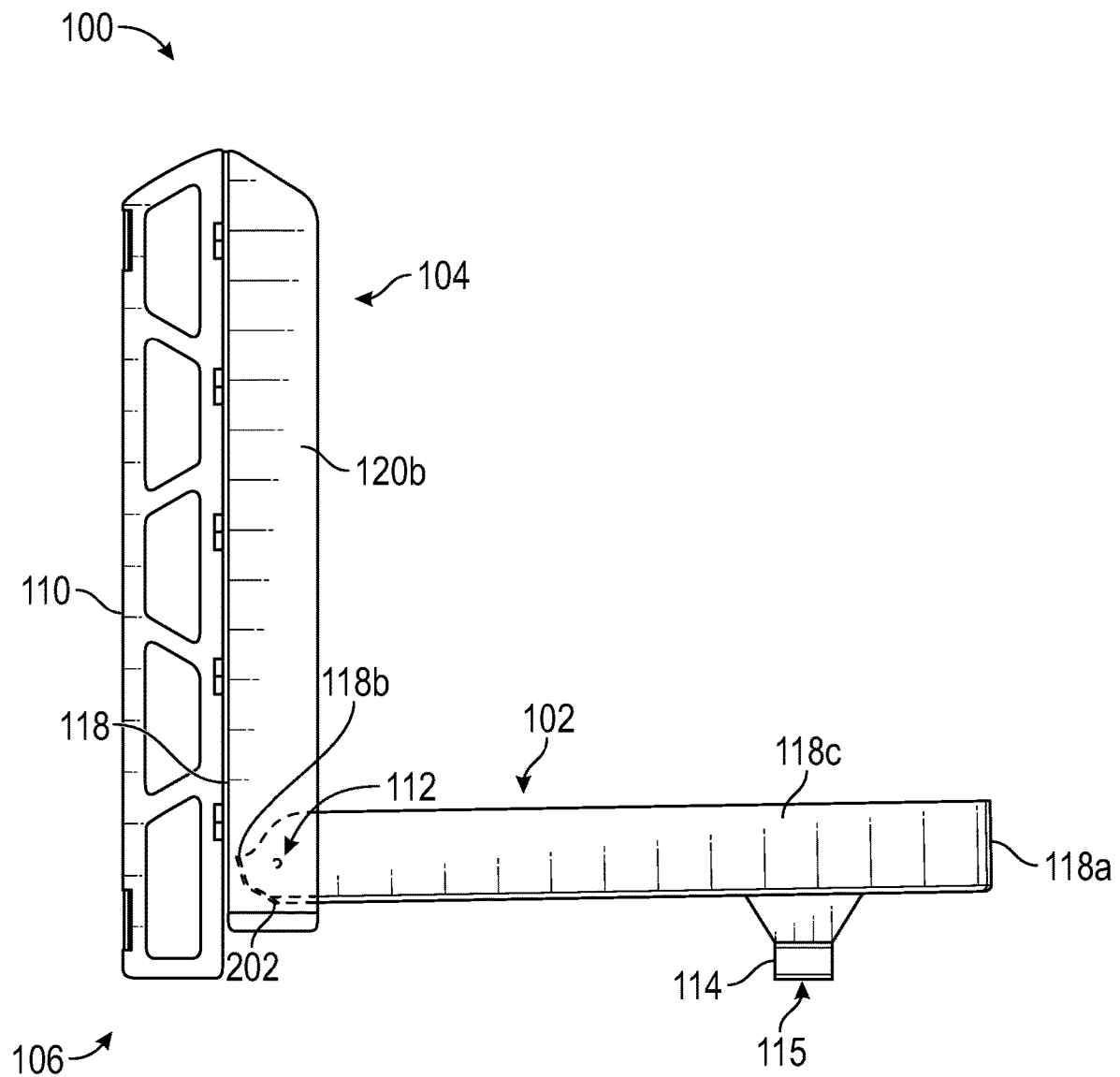
FIG. 3 illustrates a folding shower stall in an open position, according to an embodiment.

FIG. 3 is a side view of an embodiment of the folding shower stall 100 in the opened position. As illustrated in FIG. 3 embodiments of the attachment bracket 106 can be longer in length than the vertical length of the shower wall 104. The shower pan support 114 as shown in FIG. 3 can include additional features, such as scratch resistant components 115 that are configured to provide for a scratch resistant contact with the horizontal surface upon which the folding shower stall 100 rests in the open position. The scratch resistant components 115 can be rubber, acrylic, plastic, foam, high density polyethylene (HDPE), or other materials that will provide a consistent, secure, and scratch resistant connection between shower pan support 114 and the horizontal surface of the structure. The configuration of the drain portion of the shower pan 102 is illustrated in FIG. 3 in which the drain wall 202 is angled to allow wastewater to be directed towards the drain slots 116.

Figure 4:
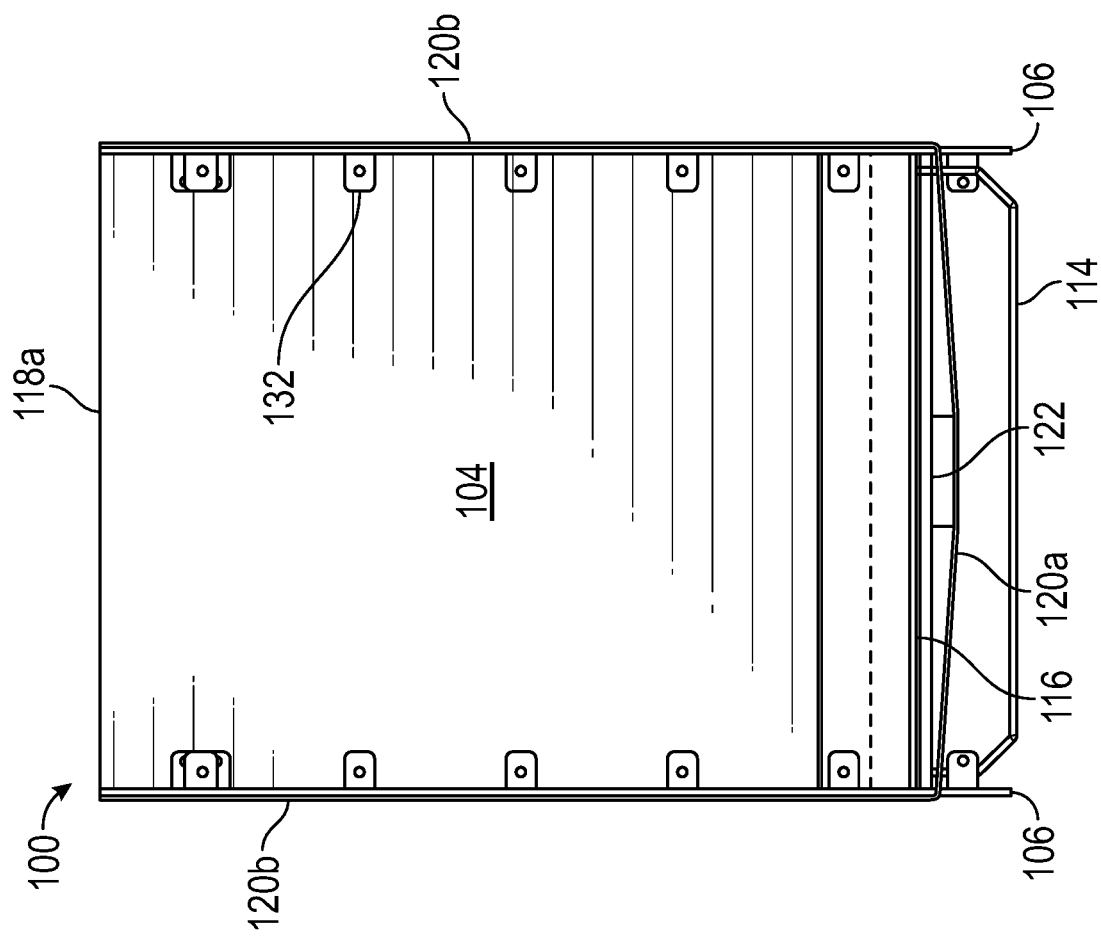
FIG. 4 illustrates a folding shower stall in a closed position, according to an embodiment.

FIG. 4 is a front view of an embodiment of the folding shower stall 100 in the opened position. Multiple mounting tabs 132 are illustrated behind the folding shower stall 100 securing the shower wall 104 to the attachment brackets 106. As illustrated in FIG. 4, shower wall bottom side wall 120a angles downward from the shower wall side walls 120b towards the drainage aperture 122. This downward angle directs the wastewater to the drainage aperture 122. FIG. 4 further illustrates the shower pan support 114 below the shower pan 102.

Figure 5:
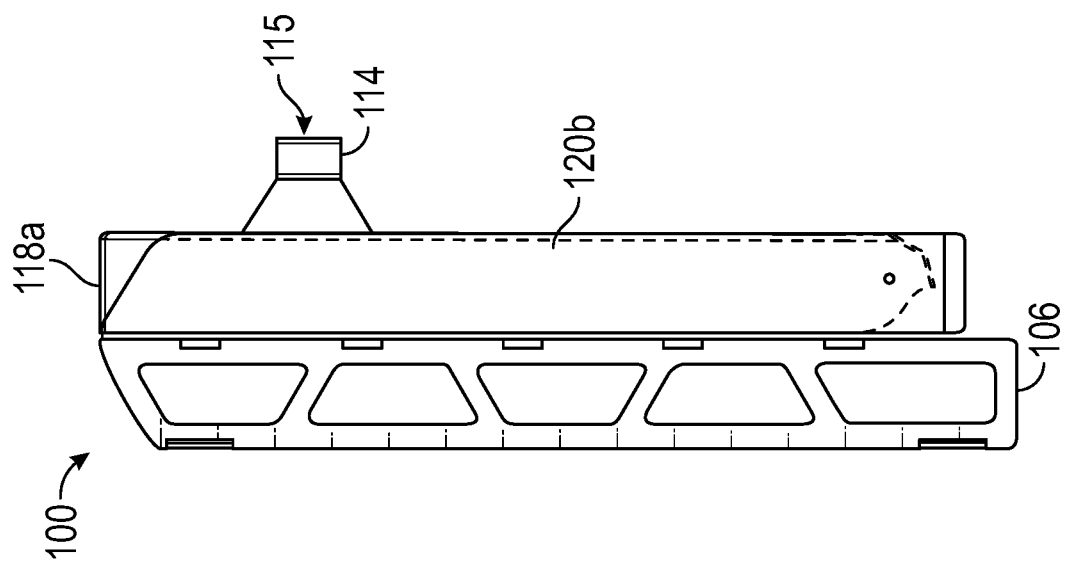
FIG. 5 illustrates a folding shower stall in a closed position, according to an embodiment.

FIG. 5 is a side view of an embodiment of the folding shower stall 100 in the closed position. FIG. 5 illustrates the folding shower stall 100 when not in use. The shower pan 102 has been rotated upwards into the shower wall 104. The shower pan support 114 is in position to allow the user to reposition the shower pan 102 into the open position for use. Scratch resistant components 115 can be attached to the exterior side of the shower pan support 114 (the side distal from the shower pan outer surface 107).

Embodiments of the folding shower stall 100 can be prepared in which the height of the front side wall 118a of the shower pan 102 is equal to, or approximately equal to, the height of the corresponding left and right side walls 120b of the shower wall 104. Embodiments can further be configured to have equal or approximately equal heights for the side walls 120b of the shower wall 104, which in the closed position can allow the shower pan 102 to form a cover that keeps dirt, dust and other debris out of the interior region of the closed folding shower stall 100.

Figure 6:
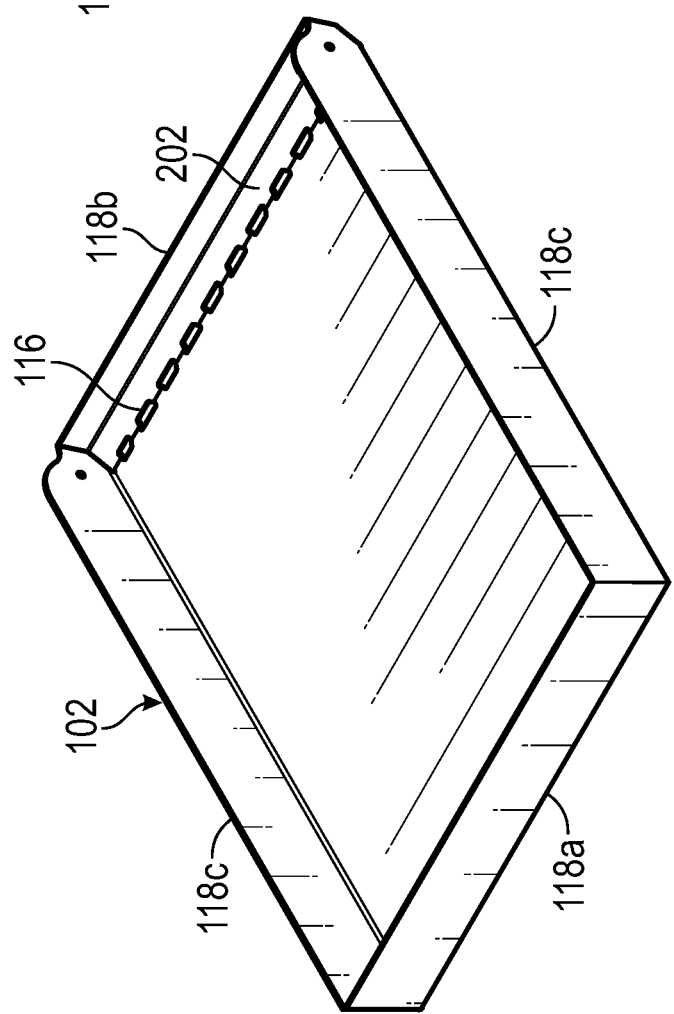
FIG. 6 illustrates a bottom section of a folding shower, according to an embodiment.

FIG. 6 is a view of an embodiment of the shower pan 102 disconnected from the shower wall 104. The embodiment shown in FIG. 6 illustrates a line of drain slots 116 running from left side wall 118c to right side wall 118c. Additionally, the drain wall 202 is angled to direct wastewater towards the drain slots 116.

Figure 7:
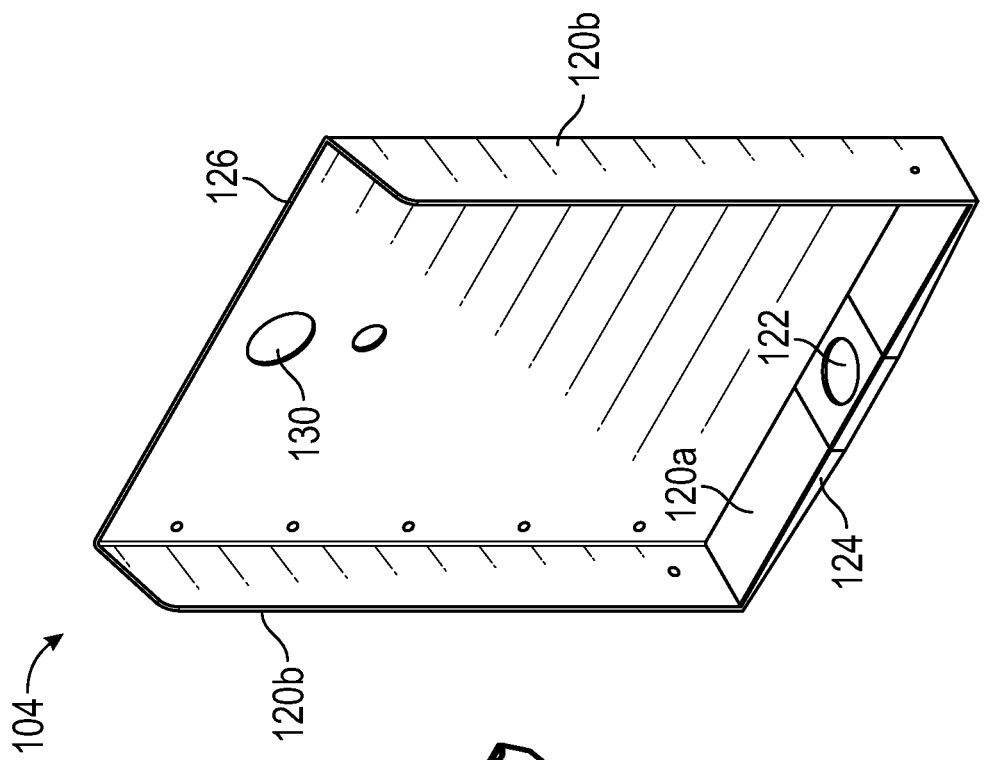
FIG. 7 illustrates a top section of a folding shower stall, according to an embodiment.

FIG. 7 is a view of an embodiment of the shower wall 104 disconnected from the shower pan 102. The embodiment illustrated in FIG. 7 depicts a drain aperture 122 located in the center of the bottom side wall 120a of the shower wall 104. Additionally, the bottom side wall 120a of the shower wall 104 slopes downwards towards the drainage aperture 122 to assist with drainage of collected wastewater. In other embodiments, the drainage aperture 122 or multiple drainage apertures 122 can be located along the shower wall bottom side wall 120a of the shower wall 104. The shower wall retaining wall 124 protrudes vertically outward from the shower wall bottom side wall 120a to provide additional assistance with the direction of the wastewater towards the drainage aperture 122.

Embodiments of the angle of the bottom side wall 120a towards the drainage aperture 122 can be between 1 and 90 degrees, preferably between 2 and 45 degrees, and most preferably between 3 and 10 degrees.

The shower wall retaining wall 124 can protrude outward from the bottom side wall 120a between 0.1 inches and 6 inches, preferably between 0.25 inches and 3 inches, most preferably between 1 inch and 3 inches. Embodiments can include a shower wall retaining wall 124 protruding between 0.25 and 2.5 inches.

FIG. 8 is a front view of an embodiment of the attachment bracket 106. The attachment bracket 106 includes fastening tabs 902 located on the first edge 108 for attachment of the shower wall 104 to the attachment bracket 106. The attachment bracket 106 further includes mounting tabs 132 on a second edge 110 for attachment of the attachment bracket 106 to the vertical wall of the structure, such as the interior vehicle wall. The attachment bracket 106 can contain multiple mounting tabs 132 and fastening tabs 902 suitable for securely holding the folding shower stall 100 and mounting the folding shower stall 100 to the structure. The mounting tabs 132 and fastening tabs 902 can be secured with nails, screws, bolts, rivets, or other suitable securing components.

FIG. 9 is a side view of an embodiment of the attachment bracket 106. As discussed with FIG. 8, multiple mounting tabs 132 and fastening tabs 902 can be used with the attachment brackets 106. Additionally, Embodiments can include one, two or more attachment brackets 106 to securely mount the folding shower stall 100 to the structure. As illustrated in the embodiment in FIG. 9, two mounting tabs 132 are disposed along the second edge 110 of the attachment bracket 106 to facilitate attachment of the attachment brackets 106 to the structure. Multiple mounting tabs 132 may be used in alternative embodiments. In embodiments without the mounting tabs 132 the attachment brackets 106 can be secured directly to the vertical surface of the structure using welding, an adhesive, rivets or other securing and/or mounting systems. Alternatively, shower wall 104 can be directly attached and/or mounted on the vertical surface using welding, an adhesive, rivets or other securing and/or mounting systems.

In an embodiment, multiple fastening tabs 902 are disposed along the first edge 108 of the attachment brackets 106 to facilitate attachment of the attachment brackets 106 to the shower wall 104. Any suitable attachment means, such as bolts, screws, wires, adhesive, welding or other securing and/or mounting systems can be used in the various embodiments to secure the attachment bracket 106 to the shower wall 104. Any suitable number of fastening tabs 902 may be used in the various embodiments.

Alternatively, attachment bars or strips may be used to secure the attachment brackets 106 to the shower wall 104. Such attachment bars or strips may provide additional structural support to the shower wall 104. Similarly, support bars or straps can be secured to the bottom side of the shower pan 102 to provide additional structural support.

Figure 10:
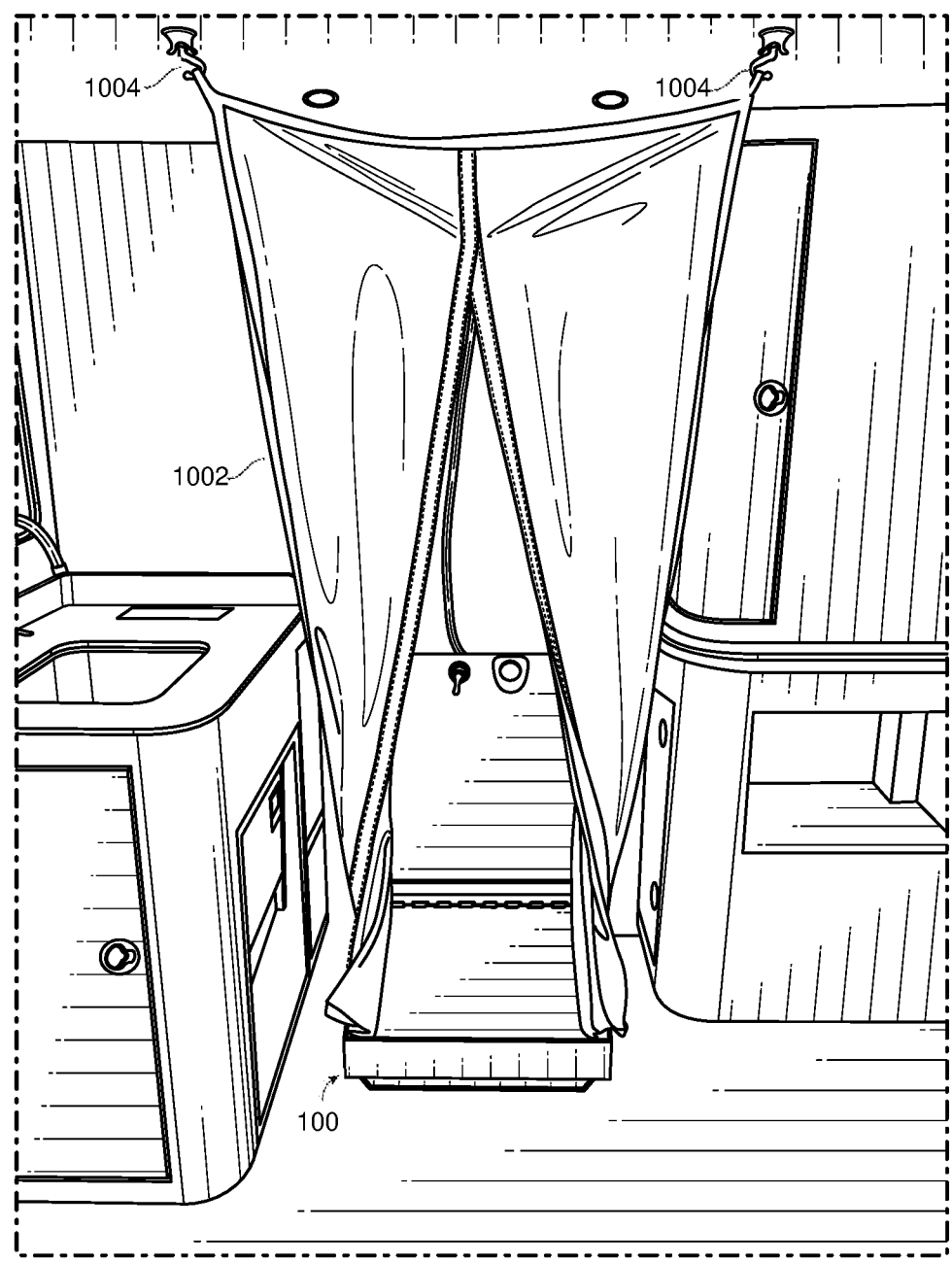
FIG. 10 illustrates a shower curtain of a folding shower stall, according to an embodiment.

FIG. 10 illustrates the folding shower stall 100 in the opened position with a shower curtain enclosure 1002, according to an embodiment. Any suitable shower curtain enclosure 1002 may be used in the various embodiments. Embodiments can include ceiling hooks 1004 that are secured to the roof of a vehicle or a ceiling of the structure. The upper edge of the shower curtain enclosure 1002 can be releasably secured to the ceiling hooks 1004. The length of the shower curtain enclosure 1002, when coupled and/or attached to the ceiling hooks 1004 extends from the ceiling hooks 1004 to the shower pan 102, allowing the user to shower and retaining the shower water within the interior of the shower curtain enclosure 1002.

Embodiments of the shower curtain enclosure 1002 extend from the ceiling hooks 1004 to the shower pan 102, allowing a lower portion (or lower edge) of the shower curtain enclosure 1002 to be placed inside the side walls 118 of the shower pan 102. This assists with directing the shower water flowing down the interior sides of the shower curtain enclosure 1002 to flow into the shower pan 102 and drain out through the drain slots 116. During a shower, the lower portion of the shower curtain enclosure 1002 can be configured to fit inside of the shower pan side walls 118. Embodiments of the shower curtain enclosure 1002 can be configured to attach to the shower pan side walls 118 to form a continuous wall trapping water within the folding shower stall 100. Alternatively, magnets or other securing systems can be used to secure the lower portion of the shower curtain enclosure 1002 to the shower pan side walls 118. Magnets can also also used to secure the curtain to the upper and side portions of shower wall 104. Embodiments of the shower curtain enclosure 1002 can be configured to attach to ceiling hooks 1004 on an upper vertical surface of a structure and be affixed via magnets to the side walls of the shower pan 102. The shower curtain enclosure 1002 can be prepared from any suitable materials, including, but not limited to cloth, plastics, waterproof or water-resistant materials, polyurethane coated nylon ripstop, or other suitable materials. In an embodiment, the shower curtain enclosure 1002 is configured to be stored inside the closed folding shower stall 100 either inside a storage component, such as a bag, lining, or other suitable component, or in a folded configuration. Embodiments of the shower curtain enclosure 1002 can be configured to fit around or accommodate the folding shower stall 100. The shower curtain enclosure 1002 can have lower back portion cut out to provide access to the shower wall 104. Alternative configuration of the shower curtain enclosure can be prepared to accommodate the user, the structure, and/or the folding shower stall 100. Preferably, the material readily dries and can be folded and/or packed into a compact container for storage either within the folding shower stall 100 or elsewhere within the vehicle or structure when not in use.

Figure 11:
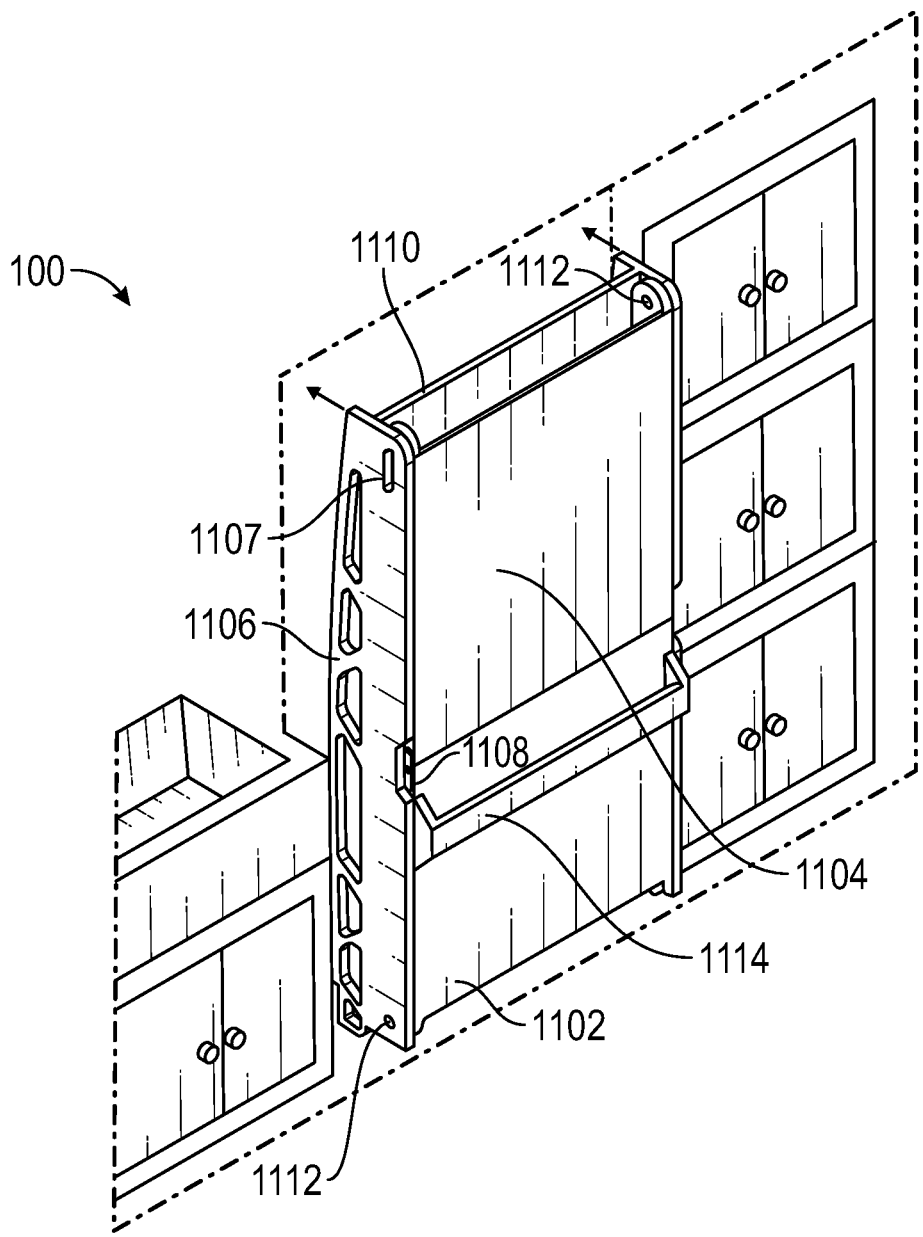
FIG. 11 illustrates an alternative embodiment of a folding shower stall, according to an embodiment.

FIG. 11 illustrates an alternative folding shower stall 1100 in the closed position, according to an embodiment. The folding shower stall 1100 includes a shower pan 1102, a shower wall 1104, a shower pan support 1114, and a shower base 1110 (or shower body). The shower base 1110 further includes attachment brackets 1106 secured and/or incorporated into the shower base 1110. The shower pan 1102 and the shower wall 1104 are rotatably and/or pivotally mounted to the attachment brackets 1106 at hinges 1112. Draw latches 1108 secure the shower pan 1102 and shower wall 1104 in the closed position. Lever clamps 1107 secure the shower pan 1102 and shower wall 1104 in the open position. The draw latches 108 are configured to secure the shower pan 102 and shower wall 104 in a closed position, and the lever clamps 1107 are configured to secure the shower wall 104 in an upright vertical position.

The shower pan support 1114 supports the shower pan 102 in the open position by resting on the horizontal surface of the structure or vehicle floor and provides a handle to assist the user with opening the folding shower stall 1100. The attachment brackets 1106 include the hinges 1112, the draw latches 1108 and lever clamps 1107. The attachment brackets 1106 can attach the folding shower stall 1100 to the structure. The shower base 1110 and/or attachment brackets 1106 can be secured to the structure via mounting tabs 132, by welding, rivets, nuts and bolts, screws, or other securing and/or mounting systems. The shower pan 102 and the shower wall 104 are rotatably affixed to the shower base 1110. The shower pan 102 is configured to rotate downward from the shower base 1110, and the shower wall 104 is configured to rotate upwards from the shower base 1110.

Figure 12:
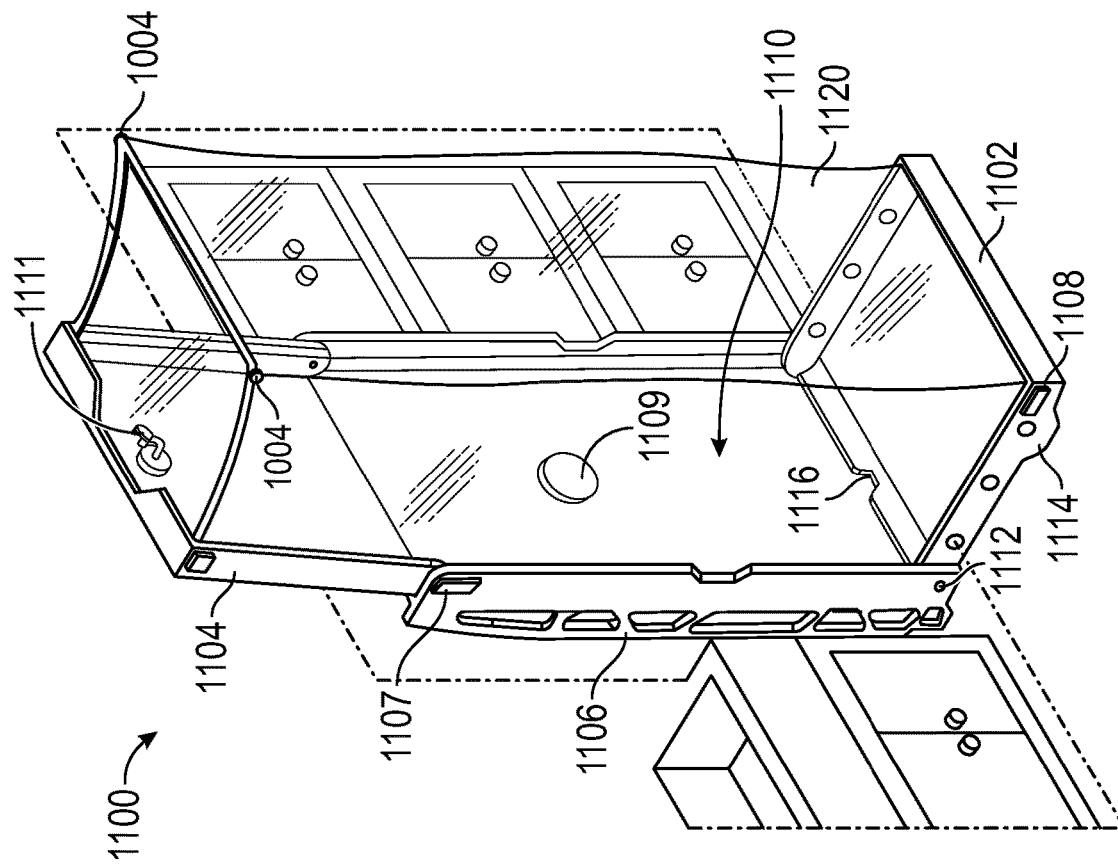
FIG. 12 illustrates an alternative embodiment of a folding shower stall, according to an embodiment.

FIG. 12 illustrates an alternative folding shower stall 1100 in the opened position with a shower curtain enclosure 1120, according to an embodiment. The folding shower stall 1100 further includes a shower curtain enclosure 1120, a shower mixer valve 1109, ceiling hooks 1004, a shower spray holder 1111, and drain 1116. The folding shower stall 1100 as illustrated in FIG. 12 is in the open position in which the shower wall 1104 has been rotated upwards into a vertical position and locked in place via the level clamps 1107. Additionally, the shower pan 1102 has been rotated downward into a horizontal position and is resting on the shower pan support 1114 which is in contact with the horizontal floor of the structure. A shower curtain enclosure 1120 is mounted and/or secured to the folding shower stall 1100 and can be connected to the ceiling of the structure or roof of the vehicle via ceiling hooks 1004. A shower mixer valve 1109 is incorporated into the shower base 1110 and can be connected to plumbing infrastructure within the vehicle or structure. The shower mixer valve is preferably marine grade plumbing materials and allows the user to control the flow and temperature of the water in the folding shower stall 1100. The shower spray holder 1111 is mounted and/or incorporated into the shower wall 1104 and provides an attachment point for an extendible and flexible shower hose and shower head. A drain 1116 is incorporated into the shower base 1110 and/or the shower pan 1102. The shower drain can be a low-profile marine grade shower drain suitable for use with the folding shower stall 1100.

Figure 13:
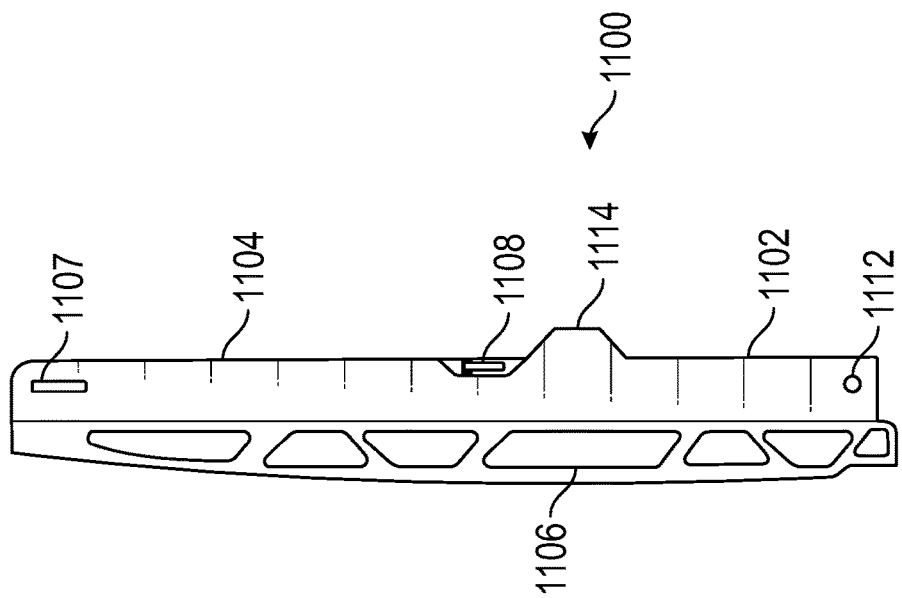
FIG. 13 illustrates an alternative embodiment of a folding shower stall, according to an embodiment.

FIG. 13 illustrates an attachment bracket 1106 of an alternative folding shower stall 1100, according to an embodiment. FIG. 13 illustrates the folding shower stall 1100 in the closed position. Shower pan 1102 and shower wall 1104 are in the closed position, rotated into the body formed by the attachment brackets 1106. The rear portion of the attachment brackets 1106 can have a lattice structure to provide reduced weight to the folding shower stall 1100. Variations of the lattice structure can be employed that provide sufficient structural support with reduced weight.

Embodiments of the shower base 1110 can be prepared from steel sheet, aluminum, titanium, acrylics, ceramics, tempered wood, plastics, or other suitable materials. The shower base 1110 can be between 16 inches and 96 inches tall, 10 inches and 48 inches wide, and 1 inch and 12 inches deep, preferably between 30 inches and 70 inches tall, 20 inches and 30 inches wide, and 2 inches and 6 inches deep, and most preferably, between 46 inches and 56 inches tall, 20 inches and 24 inches wide, and between 3.5 inches and 4.5 inches deep. Embodiments include a shower base 1110 that is approximately 50 inches tall, 22 inches wide and 4 inches deep.

Embodiments of the shower pan 1102 can be prepared from steel sheet, aluminum, titanium, acrylics, ceramics, tempered wood, plastics, or other suitable materials. The shower pan 1102 can be between 10 inches and 40 inches tall, 10 inches and 48 inches wide, and between 1 inch and 12 inches deep, preferably between 20 inches and 30 inches tall, 20 inches and 30 inches wide, and 2 inches and 6 inches deep, and most preferably, between 26 inches and 30 inches tall, 20 inches and 24 inches wide, and 3.5 inches and 4.5 inches deep. Embodiments can include a shower pan 1102 that is approximately 28 inches tall, 22 inches wide, and 4 inches deep.

Embodiments of the shower wall 1104 can be prepared from steel sheet, aluminum, titanium, acrylics, ceramics, tempered wood, plastics, or other suitable materials. The shower wall 1104 can be between 10 inches and 40 inches tall, 10 inches and 48 inches wide, and 1 inch and 12 inches deep, preferably between 20 inches and 30 inches tall, 20 inches and 30 inches wide, and 2 inches and 6 inches deep, and most preferably, between 20 inches and 24 inches tall, 20 inches and 24 inches wide, and 3.5 inches and 4.5 inches deep. Embodiments can include a shower wall 1104 that is approximately 22 inches tall, 22 inches wide, and 4 inches deep.

Embodiments of the folding shower stall 1100 can have a shower base 1110 in which attachment brackets 1106 are a part of the shower base 1110 or separate attachment brackets 1106 which can be secured to the shower base 1110. Embodiments of the attachment brackets 1106 can be prepared from steel sheet, aluminum, titanium, acrylics, ceramics, tempered wood, plastics, or other suitable materials. The attachment brackets 1106 can be between 1 and 96 inches tall, and 2 inches and 10 inches deep, preferably between 1 inch and 72 inches all, and 1 inch and 6 inches deep, and most preferably, between 48 inches and 54 inches tall, and 1 inch and 4 inches deep. Embodiments can include attachment brackets that are approximately 52 inches tall and 1 to 4 inches deep.

Embodiments of the attachment brackets 1106 can have a straight front edge that attaches to the shower base 1110 via flanged tabs with mounting holes, and a curved back edge that is curved to fit the contour of the interior of a vehicle wall. The curved back edge can be secured to the vehicle wall via flanged tabs with mounting holes. Embodiments of the folding shower stall 1100 can be secured to the vehicle (or structure) approximately 0.5 to four inches, preferably 1 to 2 inches, and most preferably about 1.75 inches above the vehicle floor (measured from the bottom of the attachment bracket and/or shower pan 1102). This allows the shower pan 1102 to rotate out of the folding shower stall 1100 and rest on the shower pan support 1114 at an angle that directs water back towards the drain 1116 in the shower base 1110.

Embodiments of the shower base 1110, shower pan 1102, shower wall 1104, attachment brackets 1106, and shower pan support 1114 can be laser cut from steel sheet (ranging from $1/16$ inches to $1/8$ inches) and then bent on a metal brake into the proper three-dimensional parts. These parts can be assembled using the clamp bolts and latches described above. Other components can be secured using rivets, welding, or a suitable adhesive. Other suitable material may be used for the various components, such as plastics, wood, or other metals.

Embodiments of the attachment bracket 1106 can be secured to the vertical side of a vehicle or structure via matching the shape of the back edge of the attachment bracket 1106 to the contours of the vehicle. Embodiments of the attachment brackets 1106 and/or shower base 1110 can be configured to a shape and/or dimension to correspond to the vertical surface of the vehicle or structure upon which the folding shower stall 100 is attached.

Figure 14:
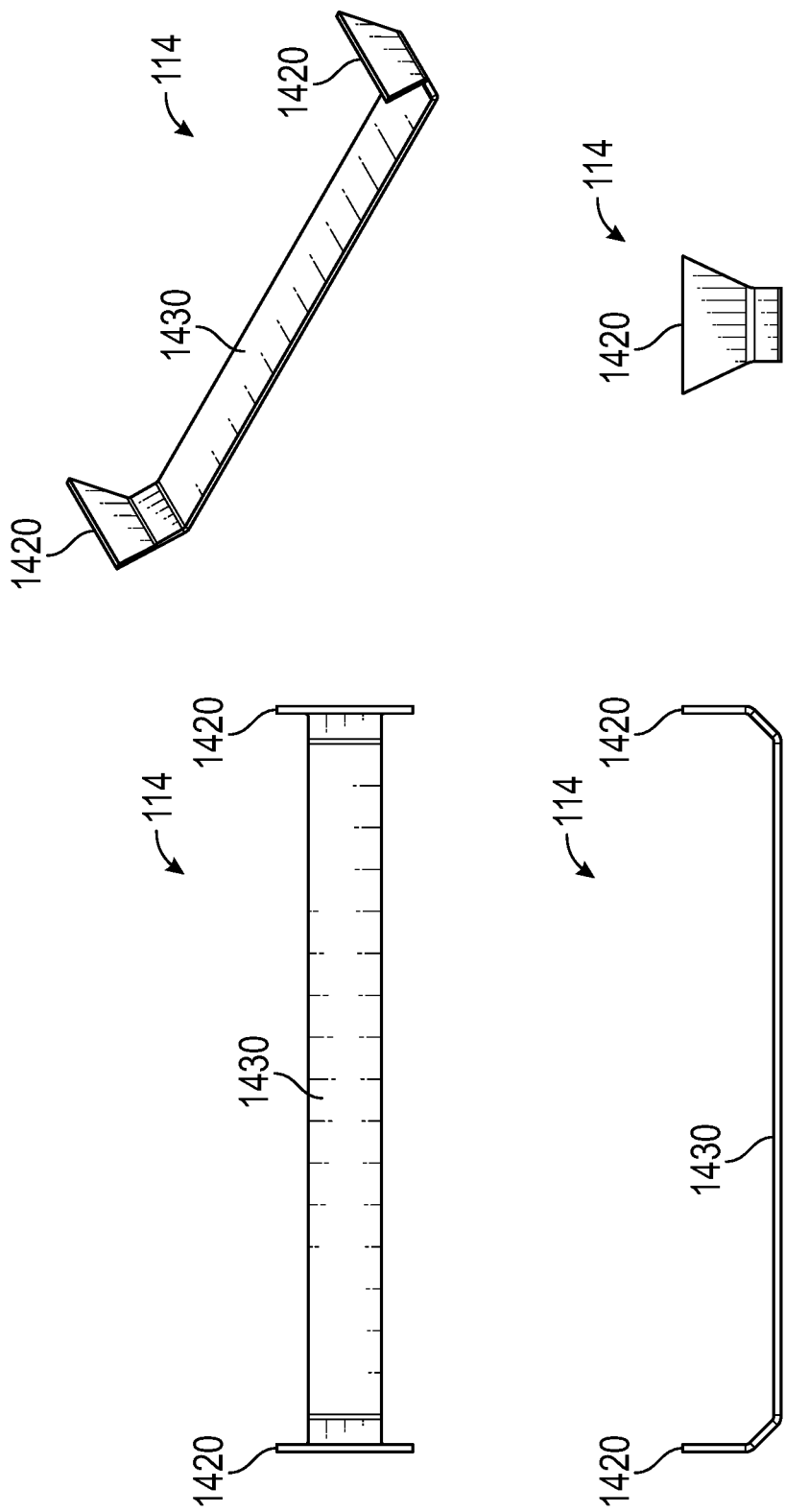
FIG. 14 illustrates a shower pan support of a folding shower stall, according to an embodiment.

FIG. 14 illustrates the shower pan support 114, according to an embodiment. FIG. 14 illustrates a top view, side view bottom view and perspective view of an embodiment of the shower pan support 114. The embodiment shown generally runs the width of the shower pan 102 and attaches to the shower pan outer surface 107 via shower pan support ends 1420. In the embodiment shown the shower pan support ends 1420 project generally outward (perpendicular) from the shower pan support base 1430. The shower pan support ends 1420 can be secured to the shower pan outer surface 107 via welding, adhesive, bolts, or other securing or mounting systems. In the embodiment shown the shower pan support ends 1420 are tapered outwards to create a wider area to secure the shower pan support 114 to the shower pan 102. Variations on the tapering, length of the shower pan support ends 1420 and shower pan support base 1430 can be prepared to provide adequate support to the folding shower stall 100 and provide a useful handle for lowering the shower pan 102.

Figure 15:
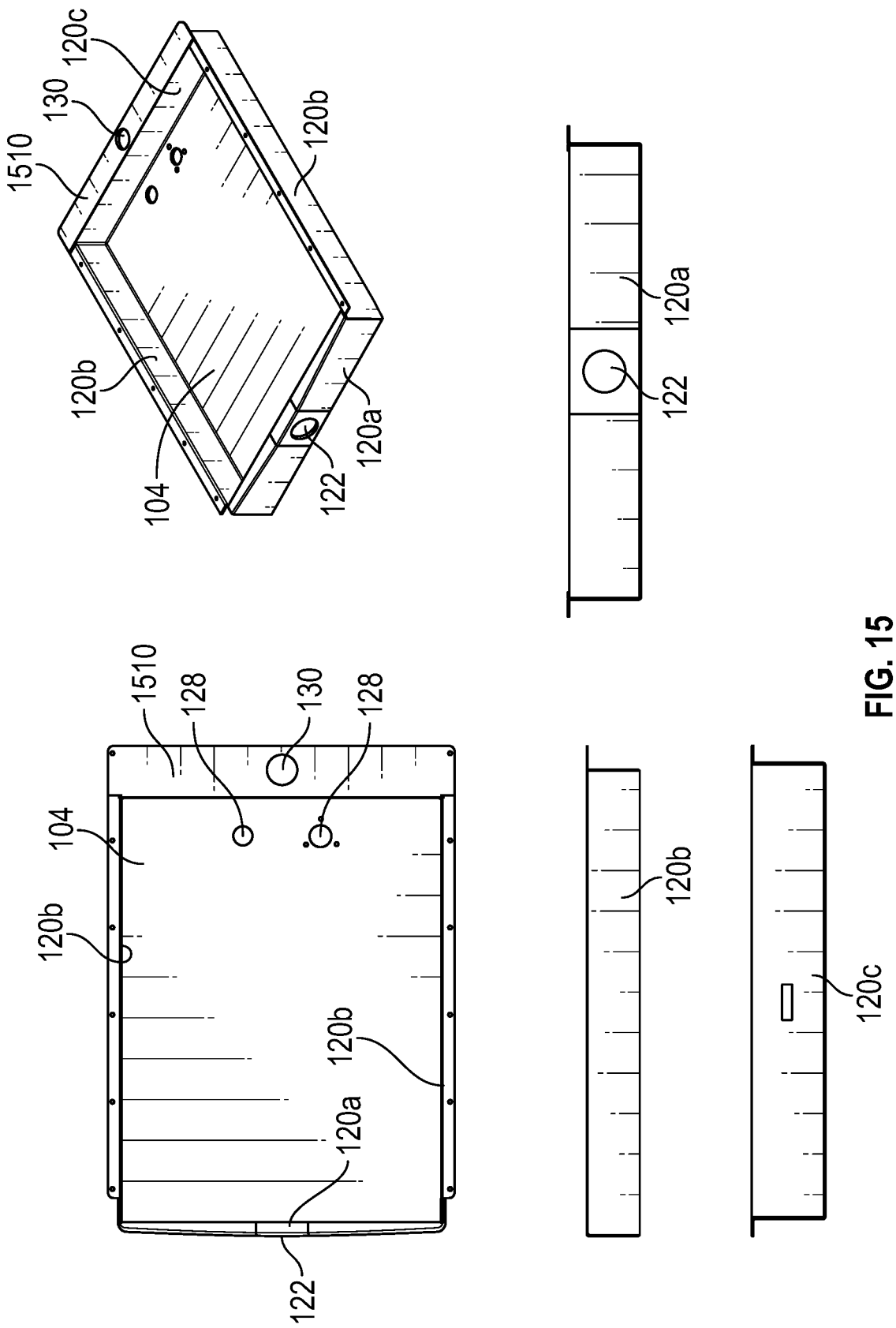
FIG. 15 illustrates an alternative upper section of a folding shower stall, according to an embodiment is a design drawing for an example shower wall.

FIG. 15 illustrates an alternative shower wall 104, according to an embodiment. FIG. 15 illustrates a top view, side views, and a perspective view of the shower wall 104, according to an embodiment. The embodiment illustrated in FIG. 15 can be employed without attachment brackets 106 and can be installed directly into a vertical wall and/or cabinet of a vehicle or structure. The embodiment shown in FIG. 15 further includes a shower wall top side wall 120*c* and a shower wall front wall 1510. The shower wall front wall 1510 extends perpendicularly from the shower wall top side wall 120*c* distal from the bottom side wall 120*b*. The shower wall front wall 1510 includes a second aperture 130. The second aperture 130 can be sized to permit passage of a shower hose and shower head that the user can pull out to a predefined length allowing the user to shower while standing on the shower pan 102. The top side wall 120*c* allows the folding shower stall 100 to have a flush mount in which the shower pan 102 fits within the shower wall 104 and enclosed in a flush manner securing any residual water and/or plumbing equipment. Additional apertures 128 are incorporated within the shower wall front surface 121.

Figure 16:
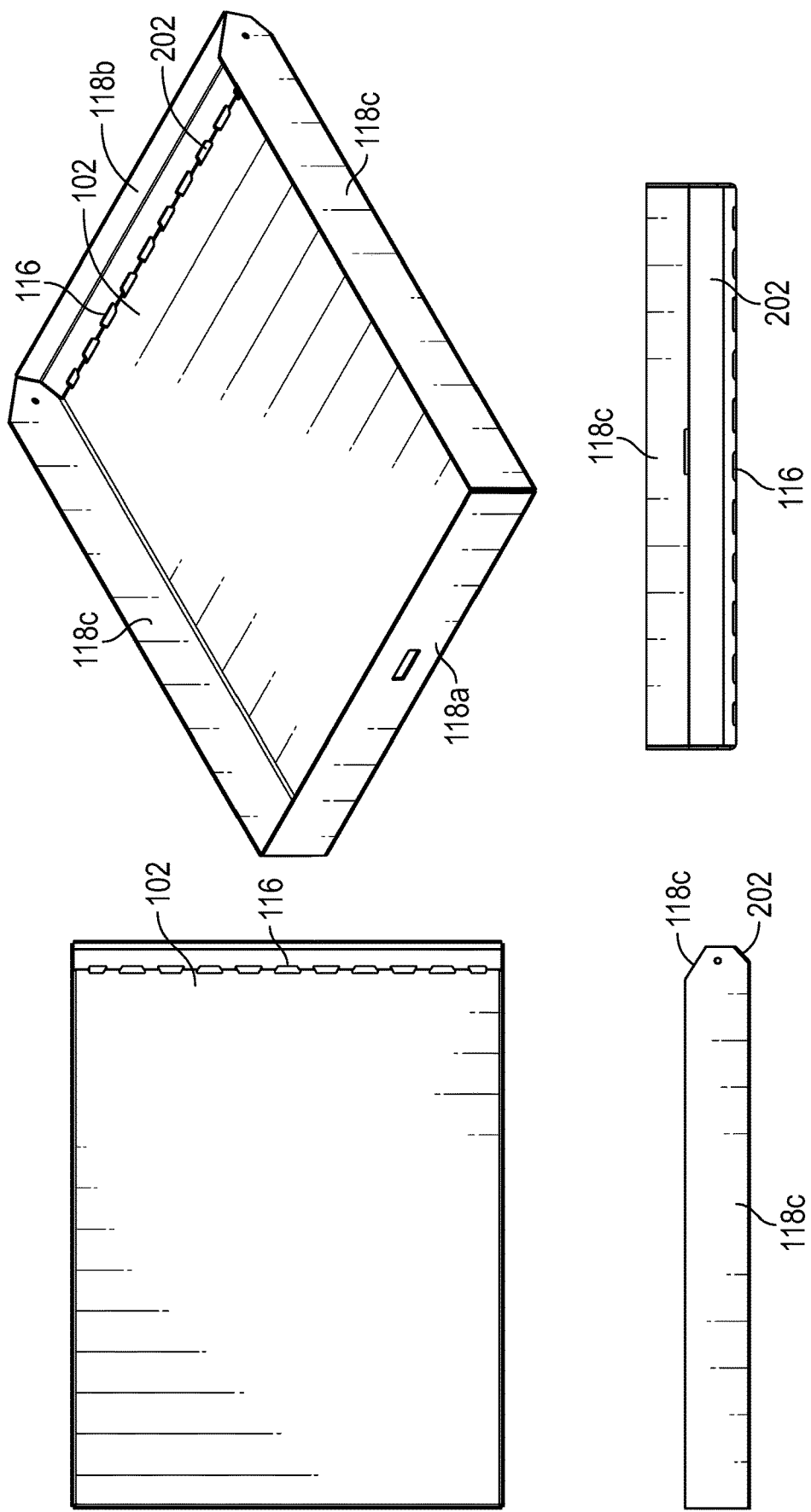
FIG. 16 illustrates an alternative shower pan of a folding shower stall, according to an embodiment is a design drawing for an example shower wall.

FIG. 16 illustrates an alternative shower pan 102, according to an embodiment. The embodiment illustrated in FIG. 16 depicts a bottom view, a back view, a side views, and a perspective view of a shower pan 102 according to an embodiment. The side view shows the angle of the drain wall 202 and the shower pan back side wall 118*c* that assists in directing the wastewater to the drain slots 116. The back view depicts the drain slots 116 below the drain wall 202.

Figure 17:
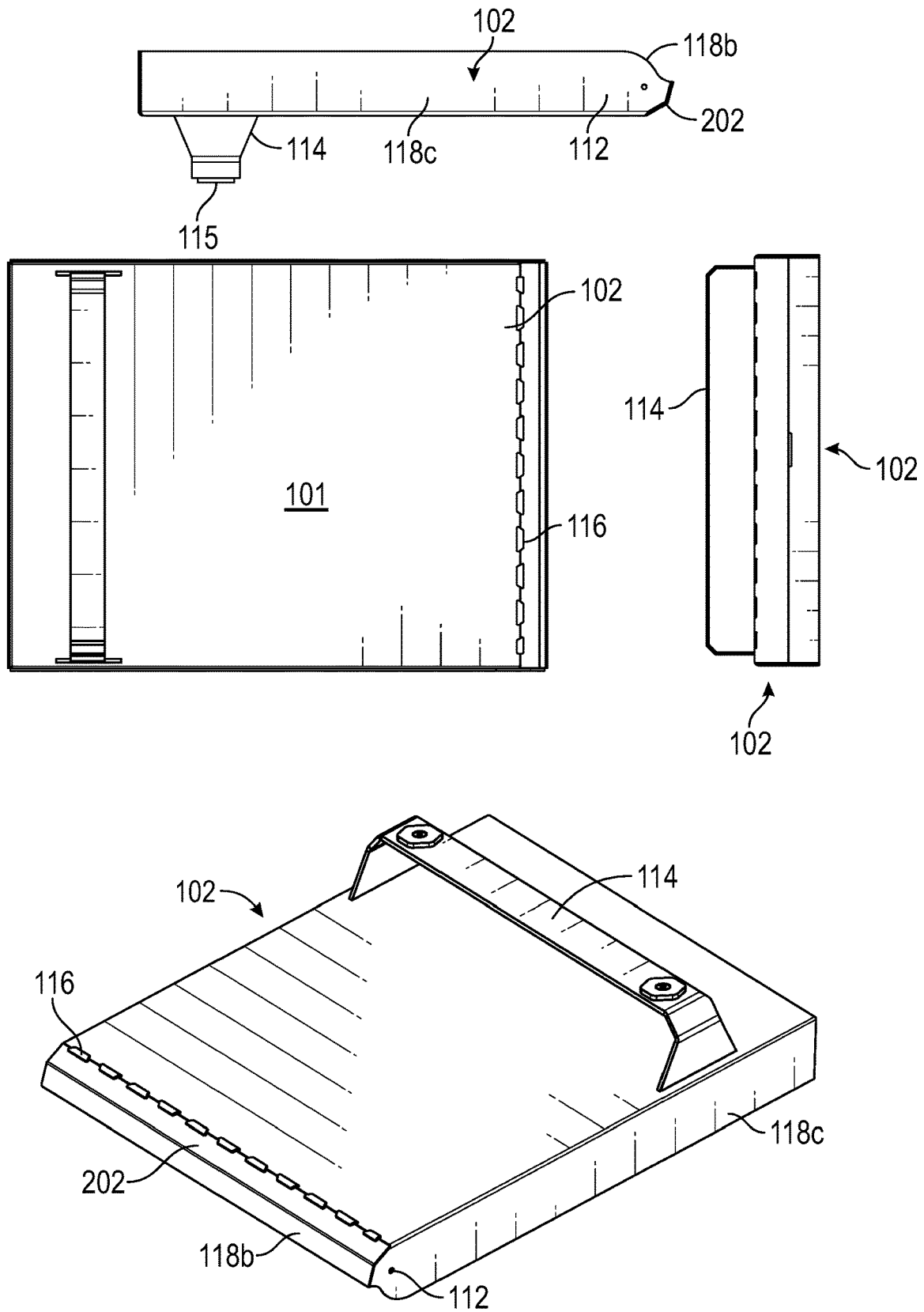
FIG. 17 illustrates an alternative shower pan of a folding shower stall with a shower pan support, according to an embodiment is a design drawing for an example shower wall.

FIG. 17 illustrates a shower pan 102 and a shower pan support 114, according to an embodiment. FIG. 17 illustrates a side view, a bottom view, a perspective view and a front view of the shower pan 102 and shower pan support 114. Scratch resistant components 115 can be employed with the shower pan support 114 to avoid scratching of the horizontal floor of the vehicle or structure upon which the shower pan support 114 rests. The side view of the shower pan 102 further depicts the angle of the drain wall and the shower pan back side wall 118*b*. The angles of the drain wall 202 and shower pan back side wall 118*b* allow the shower pan 102 to easily rotate within the folding shower stall 100 providing assistance with directing wastewater towards the drain slots 116.

Figure 18:
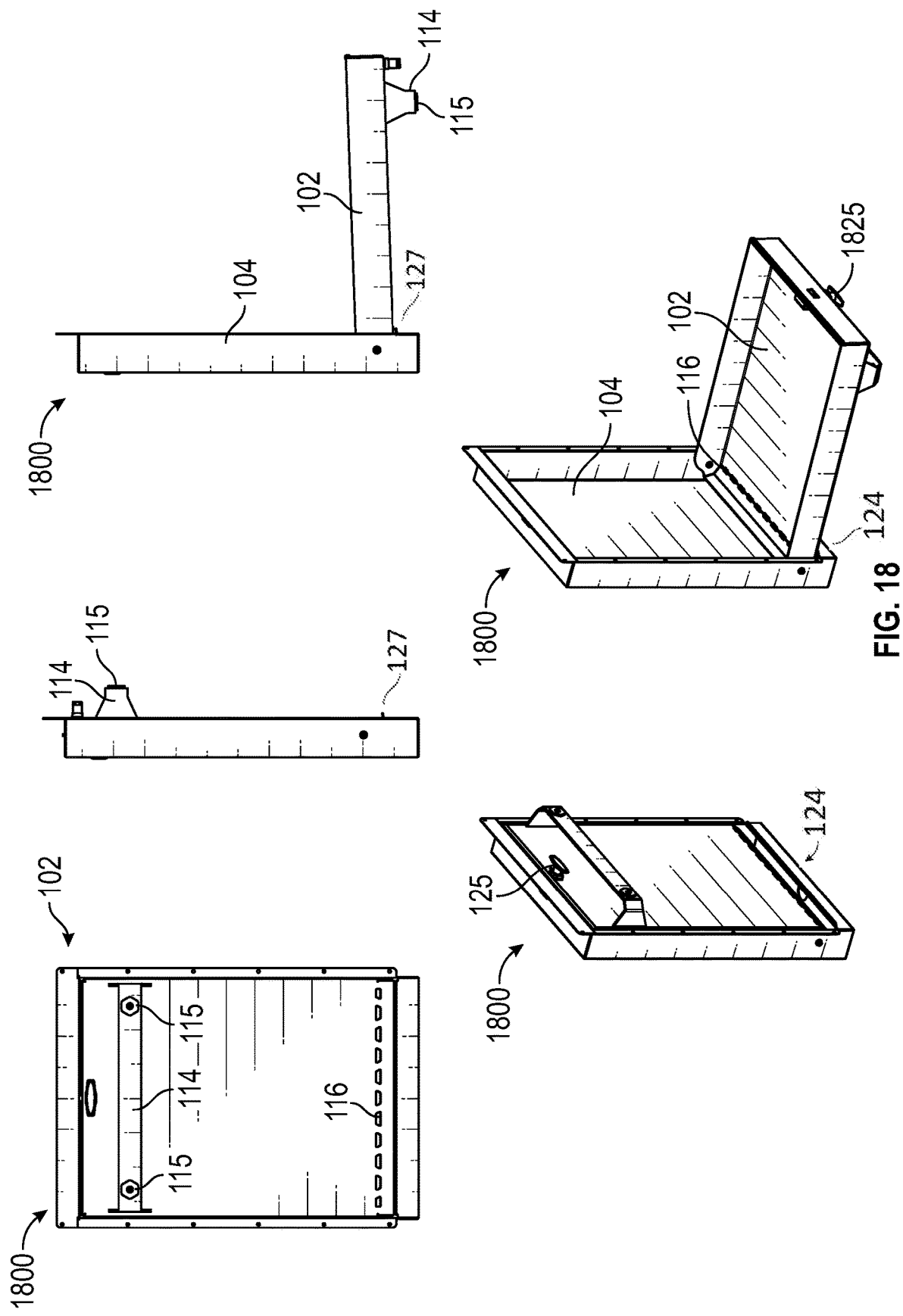
FIG. 18 illustrates an alternative folding shower stall with a shower pan support, according to an embodiment is a design drawing for an example shower wall.

FIG. 18 illustrates a folding shower stall 1800, according to an embodiment. FIG. 18 illustrates a flush mounted embodiment that can be installed in a cabinet or directly into the vertical wall of a vehicle or structure. FIG. 18 further depicts a latch 125 on the outer surface 107 of the shower pan 102 that is configured to lock the folding shower stall 1800. The latch 1825 secures the shower pan 102 and the shower wall 104 when they are stored together in the closed position. When the latch 1825 is turned it unlocks the shower pan from the shower wall and the user can lower the shower pan 102 via the shower pan support 114. FIG. 18 further illustrates scratch resistant components 115 positioned on the shower pan support 114 to aid in reducing scratching and damage to the horizontal surface upon which the shower pan support 114 rests in the open position. The folding shower stall 1800 depicted in the open position (non-perspective) illustrates the angle at which the shower pan 102 rests on the horizontal surface of the vehicle or structure. This angle assists in directing the wastewater back towards the drain slots 116. The shower wall retaining wall 124 includes a drip edge 127 that extends outward and generally perpendicular from the shower wall retaining wall 124 and at an angle downwards back into the wastewater retainment structure. The angle of the drip edge 127 can be between 1 and 30 degrees, preferably between 2 and 20 degrees, and most preferably approximately 15 degrees. Embodiments of the drip edge 127 protrude from the shower wall retaining wall 124 between 0.1 inches and 3 inches, preferably between 0.25 inches and 2 inches, and most preferably between 0.5 inches and 1 inch. An embodiment of the drip edge 127 protrudes 0.5 inches from the shower wall retaining wall 124. Embodiments of the drip edge 127 are configured to catch wastewater when the shower pan 102 is returned to the upright closed position after use. The wastewater is directed into the wastewater retainment structure.

Figure 19:
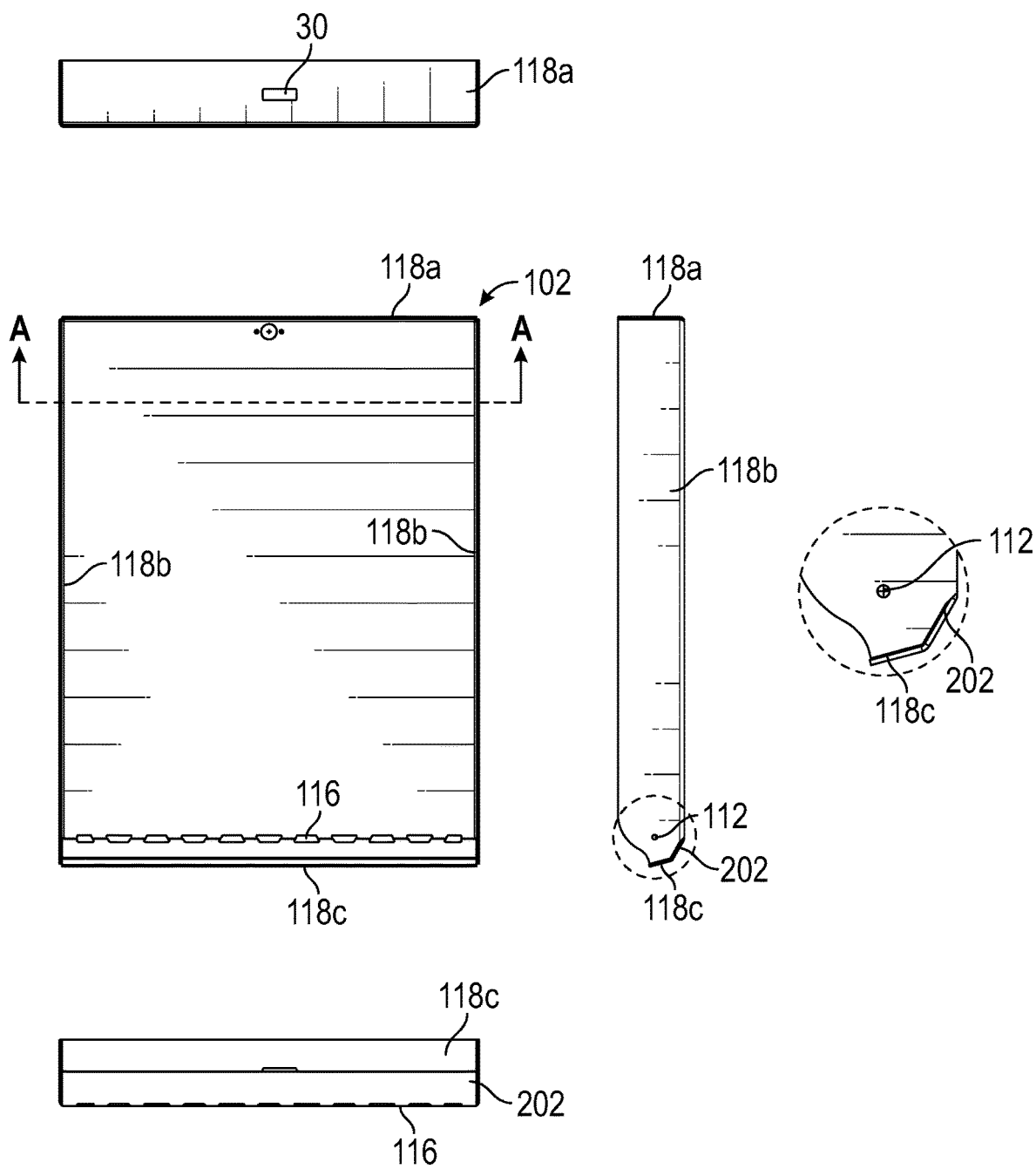
FIG. 19 illustrates an alternative shower pan for a folding shower, according to an embodiment is a design drawing for an example shower wall.

FIG. 19 illustrates an alternative shower pan 102, according to an embodiment. FIG. 19 illustrates a bottom view, a side view, a front view, a back view, and a perspective view of a shower pan 102 according to an embodiment. The shower pan 102 as illustrated in FIG. 19 contains a latch component 1930 in the shower pan front side wall 118*a*. The latch component 1930 is configured to engage with a latch on the shower wall 104 and lock the shower pan 102 and shower wall 104 together in the stored closed position.

Figure 20:
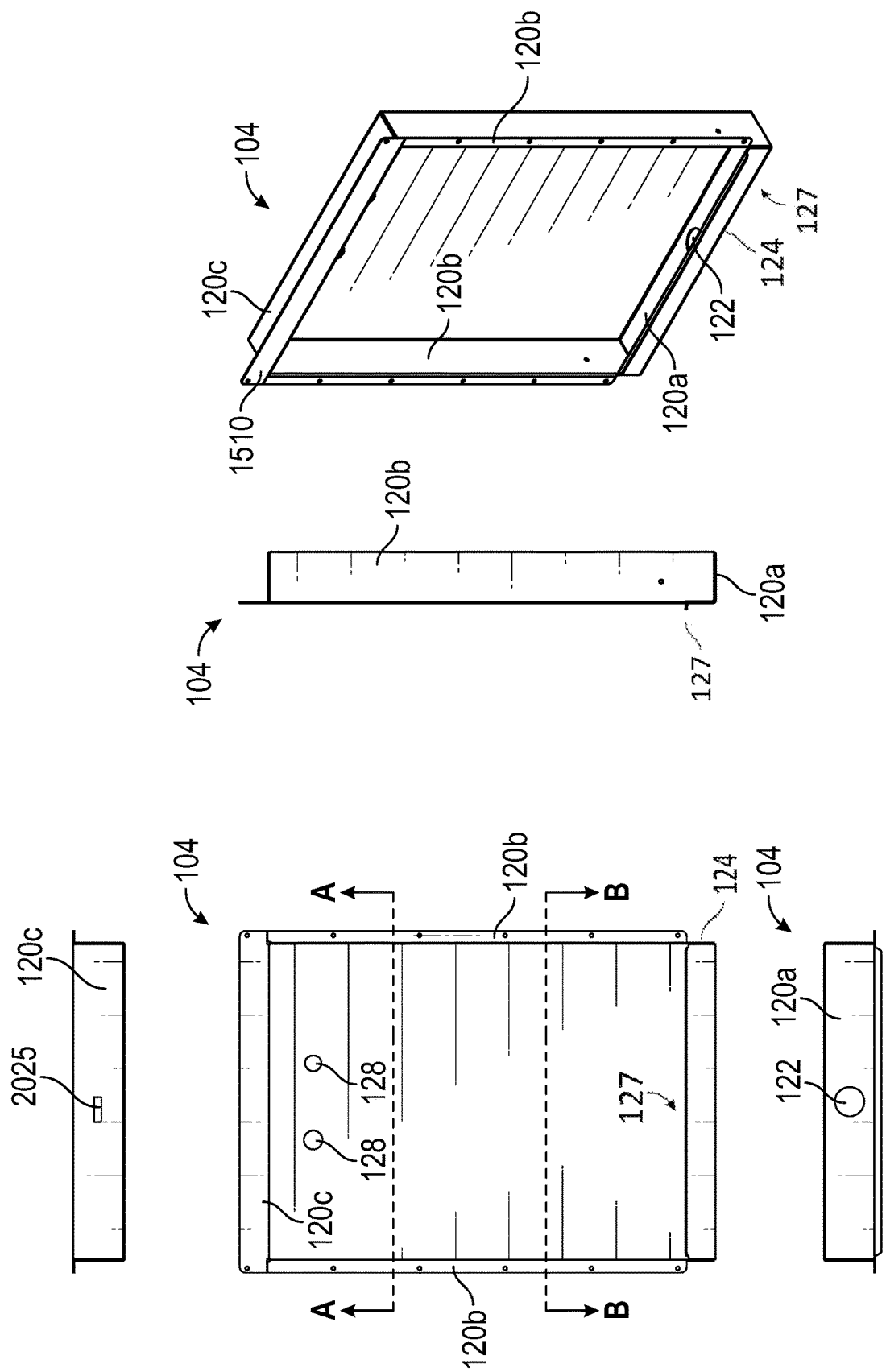
FIG. 20 illustrates an alternative shower upper section for a folding shower, according to an embodiment is a design drawing for an example shower wall.

FIG. 20 illustrates an alternative shower wall 104, according to an embedment. FIG. 20 illustrates a top view, a side view, a front view, a back view, and a perspective view of a shower wall 104 according to an embodiment. The embodiment illustrated in FIG. 20 depicts two apertures 128 in the shower wall front surface 121. FIG. 20 further illustrates a shower wall 104 with a top side wall 102*c* and a shower wall front wall 1510. Additionally, FIG. 20 illustrates a shower wall latch 2025 that is configured to engage with the shower pan latch component 1930 to lock the shower pan 102 and shower wall 104 in the closed position. The embodiment illustrated in FIGS. 19 and 20 is a flush mounted folding shower stall 100 that can be directly mounted or secured to a vertical side wall or cabinet of a vehicle or structure via the shower wall front wall 1510 that can be configured to receive screws, bolts, nuts, rivets or other securing components to flush mount the folding shower stall 100. The shower wall front wall 1510 is configured to be a face-mounting flange allowing the folding shower stall 100 to be flush mounted to a wall, cabinet, or other vertical surface. Embodiments in which the folding shower stall 100 is flush mounted can protrude less than 5 inches, preferably less than 4 inches and most preferably approximately 3 inches from the vertical surface upon which the folding shower stall 100 is mounted.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device, comprising:
   a folding shower stall comprising:
     a shower pan comprising a shower pan front side wall, a shower pan right side wall, a shower pan left side wall, a shower pan back side wall, and a drain wall, wherein the shower pan front side wall, shower pan right side wall, shower pan left side wall and drain wall extend outwardly from a shower pan upper surface;
     wherein the drain wall and the shower pan back side wall form a contiguous wall wherein the drain wall extends downward from the shower pan back side wall and at an angle towards the shower pan front side wall;
     wherein the shower pan further comprises drain slots disposed in a front surface of the shower pan, wherein the drain slots are proximate to the drain wall;
     wherein the shower pan further comprises a shower pan support disposed on a shower pan outer surface, wherein the shower pan outer surface is opposite the shower pan upper surface, and wherein the shower pan support extends outwardly from the shower pan outer surface and laterally across the shower pan outer surface and is configured to engage a horizontal surface when the shower pan is rotated downward from the shower wall; and
     a shower wall comprising a shower wall bottom side wall, a shower wall left side wall, a shower wall right side wall, and a shower wall upper edge, wherein the shower wall bottom side wall, shower wall left side wall and shower wall right side wall extend outwardly from a shower wall front surface, and
     wherein the shower wall front surface comprises a first aperture and a second aperture configured to receive plumbing infrastructure;
     wherein the shower pan and the shower wall are pivotally connected via a hinge configured to allow the shower pan to rotate upward toward the shower wall.

2. The device of claim 1, wherein the folding shower stall further comprises attachment brackets configured to attach to the shower wall to a structure, wherein the attachment brackets comprise a first edge and a second edge.

3. The device of claim 2, wherein the attachment bracket first edge comprises fastening tabs configured to attach to the shower wall, and the attachment bracket second edge comprises mounting tabs configured to attach the attachment bracket to a structure.

4. The device of claim 1, wherein the shower wall further comprises a shower wall top side wall that is opposite the shower wall bottom side wall, and wherein the shower wall bottom side wall further comprises a shower wall retaining wall extending outwardly from the shower wall bottom side wall and a drip edge extending outwardly from the shower wall retaining wall.

5. The device of claim 4, wherein the shower wall further comprises a shower wall front wall extending perpendicularly from the shower wall top side wall and distal to the shower wall bottom side wall.

6. The device of claim 1, wherein the shower pan support is configured to rest on a horizontal surface of a structure when the shower pan is rotated downward from the shower wall into an open position, and wherein the shower pan support further comprises scratch resistant components configured to contact the horizontal surface of the structure.

7. The device of claim 1, wherein the shower pan support is configured to position the shower pan in an open position at an angle that directs wastewater backwards towards the shower pan back wall, drain wall, and drain slots.

8. The device of claim 1, wherein the shower wall further comprises a drainage aperture in the shower wall bottom side wall, and wherein the shower wall bottom side wall is configured to angle downward towards the drainage aperture.

9. A device, comprising:
   a folding shower stall comprising:
     a shower pan comprising a shower pan front side wall, a shower pan right side wall, a shower pan left side wall, a shower pan back side wall, and a drain wall, wherein the shower pan front side wall, shower pan right side wall, shower pan left side wall and drain wall extend outwardly from a shower pan upper surface;
     a shower wall comprising a shower wall bottom side wall, a shower wall left side wall, a shower wall right side wall, and a shower wall top side wall, wherein the shower wall bottom side wall, shower wall left side wall, shower wall right side wall, and shower wall top side wall extend outwardly from a shower wall front surface; and
     a shower body, wherein the shower pan and the shower wall are rotatably affixed to the shower body, and wherein the shower pan is configured to rotate downward from the shower body, and the shower wall is configured to rotate upwards from the shower body.

10. The device of claim 9, wherein the shower body further comprises attachment brackets configured to attach the shower body to a structure wherein the attachment brackets further comprise:
    a back edge comprising mounting tabs configured to attach the attachment brackets to a structure, and wherein the back edge of the attachment brackets is contoured to match a vertical wall of the structure.

11. The device of claim 9, wherein the shower pan further comprises:
    a shower pan support disposed on a shower pan outer surface,
    wherein the shower pan outer surface is opposite the shower pan upper surface, and wherein the shower pan support extends outwardly from the shower pan outer surface and laterally across the shower pan outer surface, and is configured to engage a horizontal surface of a structure when the shower pan is rotated downward from the shower body.

12. The device of claim 11, wherein the shower pan support is configured to position the shower pan in an open position at an angle that directs wastewater backwards towards the shower pan back wall and drain.

13. The device of claim 9, wherein:
the shower pan further comprises a drain proximate to the shower pan back side wall,
the shower wall further comprises a shower spray holder, and
the shower body further comprises a shower mixer valve,
wherein the folding shower stall further comprises a shower curtain enclosure.

14. The device of claim 9, wherein the shower body further comprises:
draw latches configured to secure the shower pan and shower wall in a closed position, and
lever clamps configured to secure the shower wall in an upright vertical position.

15. The device of claim 9, wherein the shower body is affixed to a vertical wall of a vehicle via welding, an adhesive, rivets, securing systems, or mounting systems.

16. A device, comprising:
a folding shower stall comprising:
a shower pan wherein the shower pan comprises:
drain slots disposed in a shower pan upper surface, and
a drain wall,
wherein the drain slots are proximate to the drain wall;
the shower pan further comprising a shower pan support, wherein a shower pan outer surface is opposite the shower pan upper surface, and wherein the shower pan support extends outwardly from the shower pan outer surface; and
a shower wall wherein the shower wall comprises an aperture configured to receive plumbing infrastructure;
wherein the shower pan and the shower wall are pivotally connected via a hinge configured to allow the shower pan to rotate upward toward the shower wall.

17. The device of claim 16, wherein folding shower stall further comprises a shower curtain enclosure, and wherein the shower curtain enclosure is configured to attach to ceiling hooks on an upper vertical surface of a structure, and to magnets on the shower pan.

18. The device of claim 17, wherein the folding shower stall is flush mounted into a cabinet on a vertical side wall of a vehicle, and wherein the shower curtain enclosure is configured to be stored inside the folding shower stall in a closed position.

19. The device of claim 16, wherein the shower wall further comprises a latch, and the shower pan further comprises a latch component, and wherein the latch and latch component are configured to lock the shower pan and shower wall in a closed position.

20. The device of claim 16, wherein the shower pan support further comprise scratch resistant components configured to contact a vertical surface of structure upon which the shower pan support rests in an open position.

* * * * *